United States Patent
Salic et al.

(10) Patent No.: US 10,829,309 B1
(45) Date of Patent: Nov. 10, 2020

(54) GLIDE STRIPS AND GUIDE BLOCKS FOR CONVEYORS

(71) Applicant: John Bean Technologies AB, Helsingborg (SE)

(72) Inventors: Ena Salic, Helsingborg (SE); Anders Gerhard Bengt Bengtsson, Helsingborg (SE); Emil John Lavin, Helsingborg (SE)

(73) Assignee: John Bean Technologiess AB, Helsingborg (SE)

( * ) Notice: Subject to any disclaimer, the term of this patent is extended or adjusted under 35 U.S.C. 154(b) by 0 days.

(21) Appl. No.: 16/664,497

(22) Filed: Oct. 25, 2019

(51) Int. Cl.
  *B65G 21/22* (2006.01)
  *B65G 15/62* (2006.01)
  *B65G 21/02* (2006.01)
  *B65G 21/20* (2006.01)
  *B65G 21/18* (2006.01)

(52) U.S. Cl.
  CPC .............. *B65G 21/22* (2013.01); *B65G 15/62* (2013.01); *B65G 21/02* (2013.01); *B65G 21/18* (2013.01); *B65G 21/2072* (2013.01); *B65G 2812/02069* (2013.01)

(58) Field of Classification Search
  CPC ........ B65G 15/62; B65G 21/22; B65G 21/02; B65G 21/18; B65G 21/2072
  USPC ........................................ 198/778, 840, 841
  See application file for complete search history.

(56) References Cited

U.S. PATENT DOCUMENTS

| | | | | |
|---|---|---|---|---|
| 4,077,510 A | * | 3/1978 | Muller | B65G 17/067 198/840 |
| 4,953,691 A | * | 9/1990 | Janzen | B65G 17/42 198/851 |
| 5,007,528 A | * | 4/1991 | Hideharu | B65G 15/60 198/823 |
| 5,277,246 A | * | 1/1994 | Monch | B65G 15/62 165/120 |

(Continued)

FOREIGN PATENT DOCUMENTS

| | | |
|---|---|---|
| DE | 3922397 A1 | 1/1991 |
| GB | 2167371 A | 5/1986 |

(Continued)

OTHER PUBLICATIONS

Invitation to Pay Additional Fees, and, Where Applicable, Protest Fee for International Application No. PCT/US2019/026601, dated Dec. 13, 2019, 14 pages.

*Primary Examiner* — Douglas A Hess
(74) *Attorney, Agent, or Firm* — Christensen O'Connor Johnson Kindness PLLC

(57) ABSTRACT

A glide strip for a conveyor rail comprising an elongated monolithic elastic material having a constant cross-sectional shape throughout a majority of the material's length, wherein the cross-sectional shape comprises: a topmost section having a first width perpendicular to the material's length and a first height, a bottommost section having a second width perpendicular to the material's length and a second height, wherein the second width is less than the first width, and a middle section having a third width, wherein the middle section connects the topmost section to the bottommost section, wherein the first width is greater than the second width, and the second width is greater than the third width, and the bottommost section snaps on within slots of the conveyor rail.

19 Claims, 16 Drawing Sheets

(56) References Cited

U.S. PATENT DOCUMENTS

| | | | |
|---|---|---|---|
| 5,857,560 A * | 1/1999 | Bjorkholm | B29C 45/14565 198/816 |
| 6,170,649 B1 | 1/2001 | Radandt et al. | |
| 6,206,179 B1 * | 3/2001 | Haldimann | F16G 13/02 198/750.1 |
| 6,854,397 B2 * | 2/2005 | Terajima | B65G 21/06 104/95 |
| 7,011,208 B2 * | 3/2006 | Nakashima | B65G 15/64 198/840 |
| 7,156,224 B2 * | 1/2007 | Forster | B62D 55/096 198/594 |
| 7,178,664 B2 * | 2/2007 | Okabe | B65G 15/60 198/837 |
| 7,410,048 B2 * | 8/2008 | Verduijn | B65G 21/2009 198/841 |
| 7,757,840 B2 * | 7/2010 | Rogers | B65G 47/22 198/840 |
| 7,971,707 B2 * | 7/2011 | Elsner | B65G 21/22 198/841 |
| 7,997,405 B2 * | 8/2011 | Karpy | B65G 15/62 198/860.1 |
| 8,051,976 B2 * | 11/2011 | Koeda | B65G 21/06 198/837 |
| 8,096,410 B2 * | 1/2012 | Kalm | B65G 15/12 198/840 |
| 9,139,371 B2 | 9/2015 | De Angelis | |
| 9,212,002 B2 * | 12/2015 | Kliefoth | B65G 15/62 |
| 9,227,784 B2 * | 1/2016 | Laverdiere | B65G 15/62 |
| 9,434,545 B2 * | 9/2016 | DePaso | B65G 15/62 |
| 9,604,789 B2 * | 3/2017 | Askerdal | B65G 15/62 |
| 10,087,011 B2 * | 10/2018 | Toth | B65G 37/005 |
| 10,399,786 B2 * | 9/2019 | Askerdal | B65G 21/06 |
| 2006/0070860 A1 | 4/2006 | Huang | |
| 2018/0257867 A1 | 9/2018 | Askerdal et al. | |

FOREIGN PATENT DOCUMENTS

| | | |
|---|---|---|
| JP | 2018-173411 A | 5/2018 |
| WO | 2015041591 A1 | 3/2015 |
| WO | 2017/048179 A1 | 3/2017 |
| WO | 2017/087321 A1 | 5/2017 |

* cited by examiner

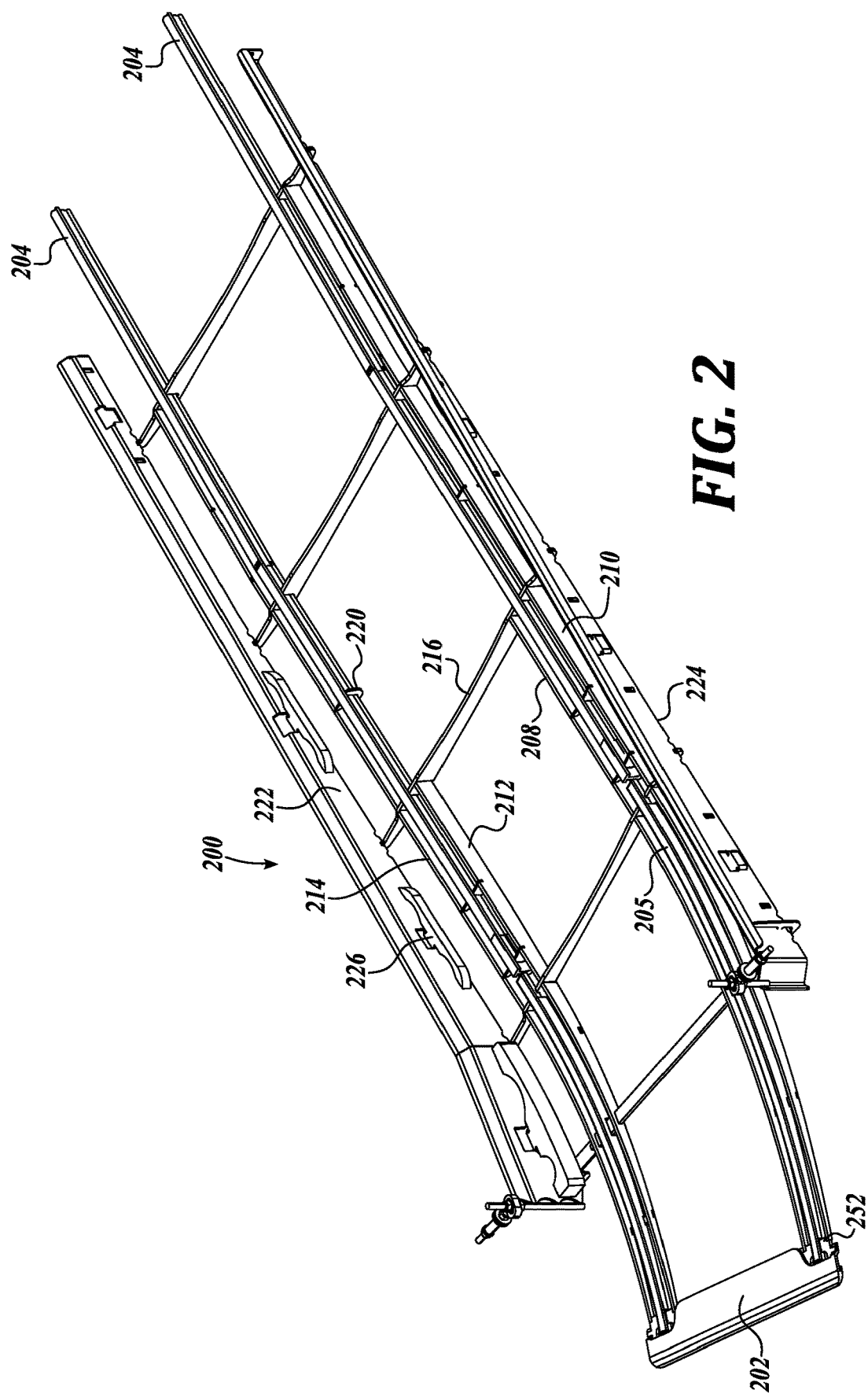

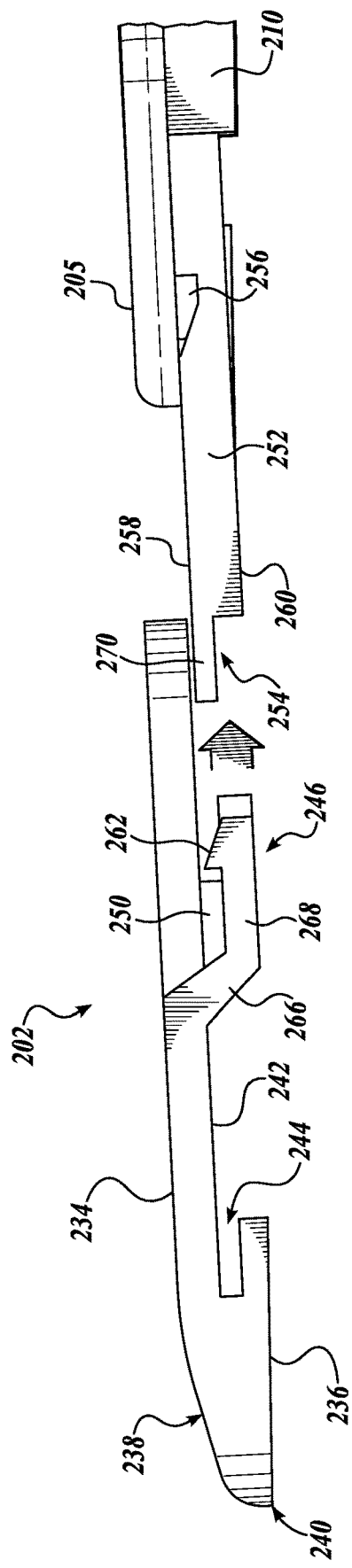
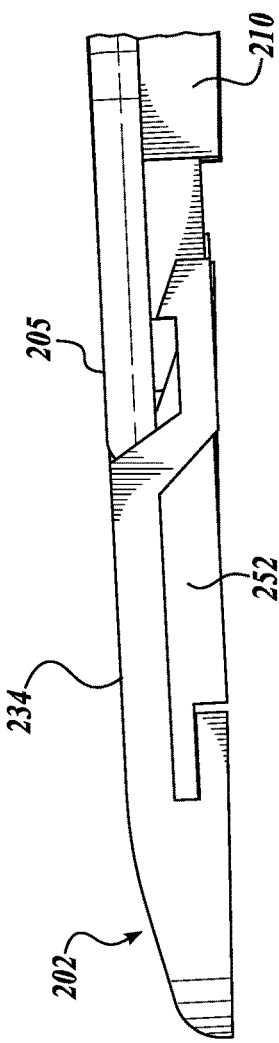
FIG. 3A
FIG. 3B

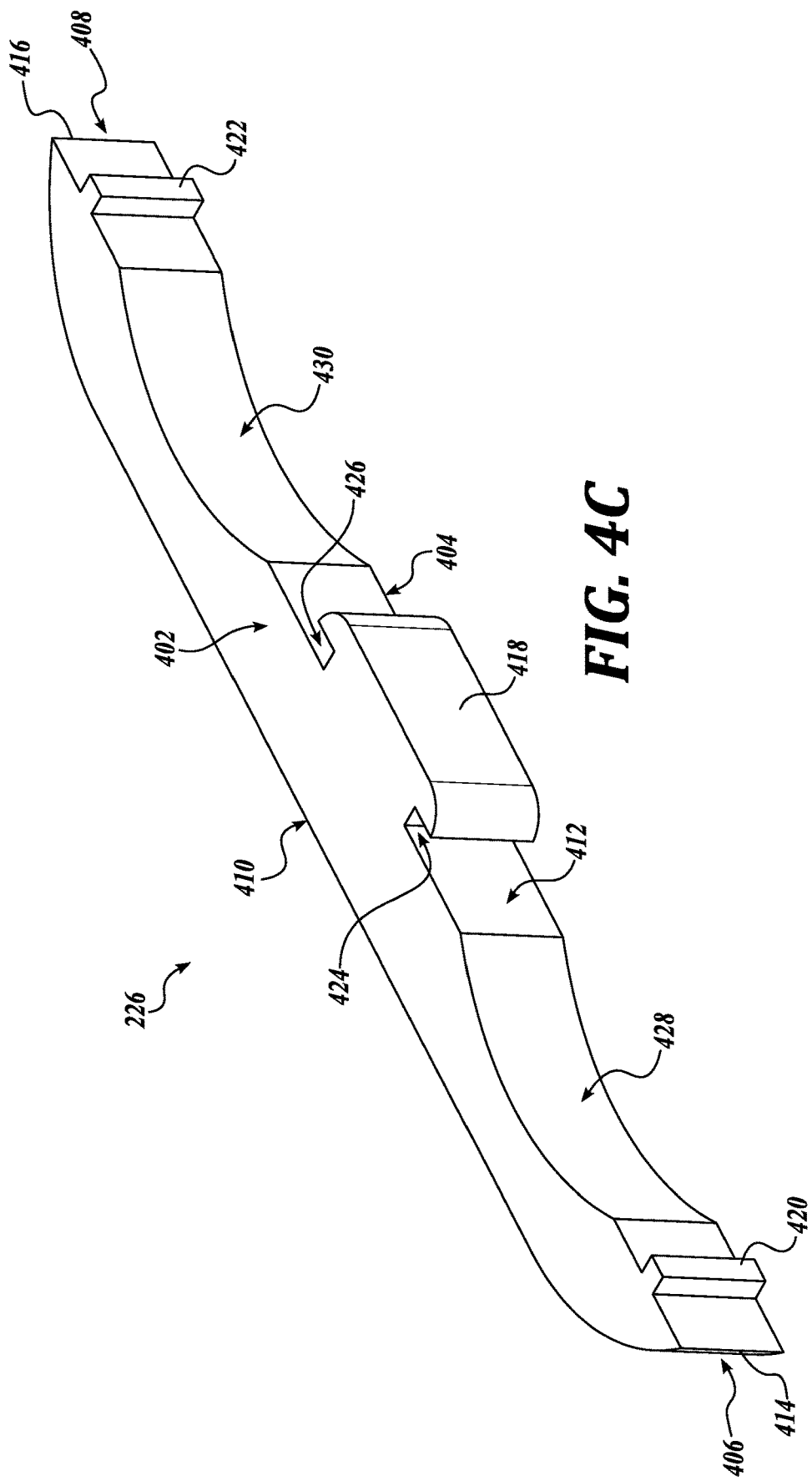

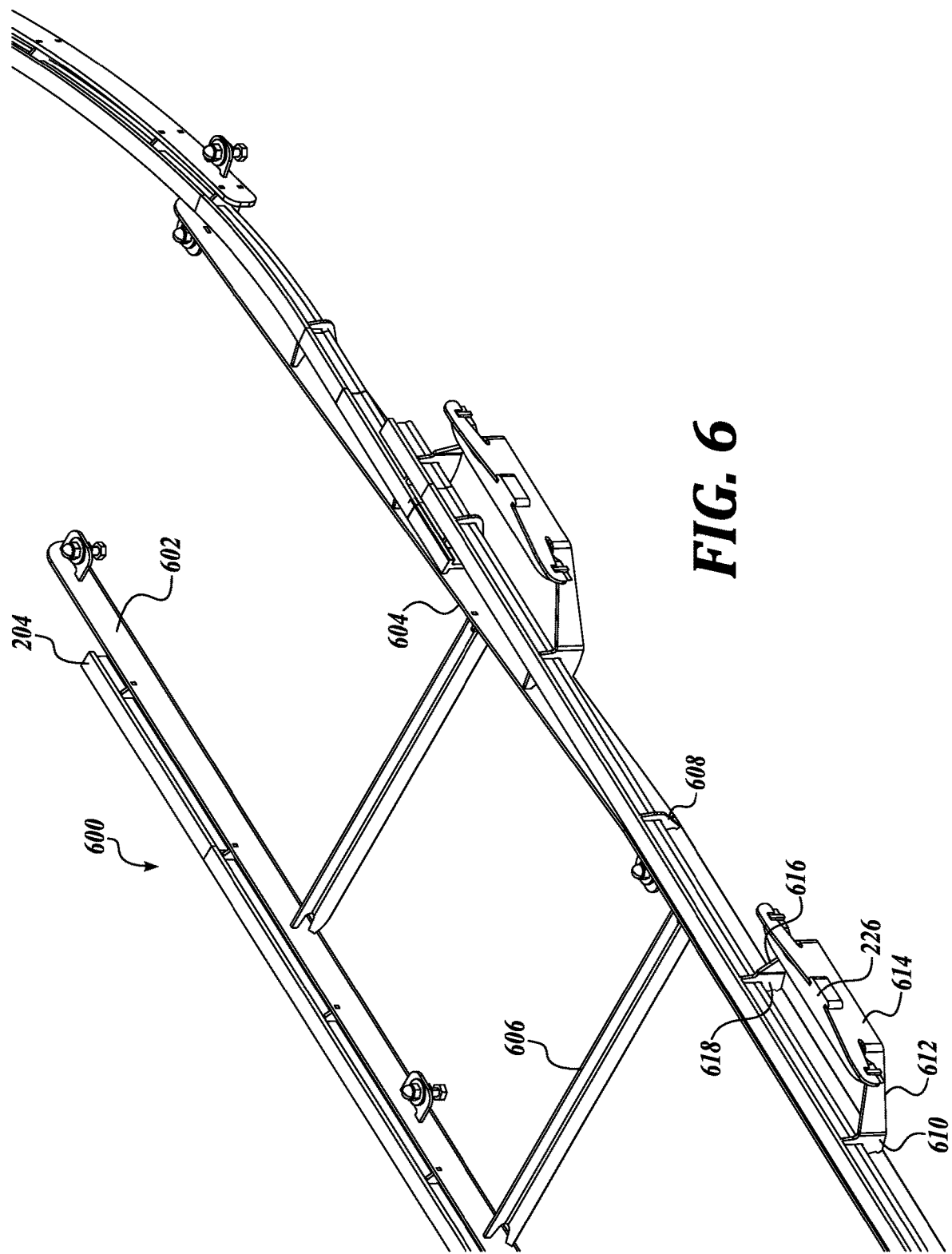

GLIDE STRIPS AND GUIDE BLOCKS FOR CONVEYORS

BACKGROUND

Industry demands for more hygienic designs in food processing equipment have led to strict requirements that focus on minimizing contact surfaces, minimizing or eliminating mechanical fasteners, providing access to allow for full inspection, and decreasing the microbe harborage areas.

SUMMARY

One embodiment of the present invention provides further improvements to the track systems used to support belts in spiral and straight conveying systems, including, but not limited to utilizing a hygienic design. The disclosed track system can be used in spiral and straight conveying systems for food, for example. A self-stacking spiral conveyor is also within the scope of this disclosure.

In a first glide strip embodiment, a snap-on glide strip 204 for a conveyor rail comprises an elongated monolithic elastic material having a constant cross-sectional shape throughout a majority of the material's length, wherein the cross-sectional shape comprises:

a topmost section 506 having a first width 520 perpendicular to the material's length and a first height 522, a bottommost section 510 having a second width 526 perpendicular to the material's length and a second height 524, wherein the second width is less than the first width, and a middle section 508 having a third width 528, wherein the middle section connects the topmost section to the bottommost section, wherein the first width is greater than the second width, and the second width is greater than the third width, and the bottommost section snaps on within slots of a conveyor rail.

In one embodiment, the topmost section 506 has an aspect ratio (width to height) from 1:1 to 5:1.

In one embodiment, an aspect ratio of the middle section 508 is from 1:1 to 1:5.

In one embodiment, an aspect ratio of the bottommost section 510 is about 1:1.

In one embodiment, a durometer of the elastic material is Shore A 60 to 90.

In one embodiment, a centroid 530, 532, 534 of the topmost, bottommost, and middle sections pass through a straight line.

In a first rail embodiment, a conveyor rail 200 comprises the glide strip 204 according to the first glide strip embodiment, and a first metal rail 214 having a plurality of supports 502 arranged along a length of the first metal rail, wherein the supports 502, 504 comprise slots 536, 538, 540 having a shape configured to receive at least the bottommost section 510 of the glide strip, and an uppermost surface of the glide strip 204 is above an uppermost surface of the first metal rail 214.

In one embodiment, the supports 502, 504 extend perpendicular from the first metal rail 214.

In one embodiment, the supports include a first 502 and second 504 type of supports.

In one embodiment, in the first type of support 502, the topmost section 506 of the glide strip 204 contacts the support, and a gap 516, 518 is between the support 502 and the middle 508 and bottommost 510 sections of the glide strip 204, wherein a load is placed on the topmost section.

In one embodiment, the support 502 includes a slot having a bottom slot section 538 wider than a top slot section 536 where it joins to the top slot section, wherein a width of the top slot section is narrower than the bottommost section 510 of the glide strip 204.

In one embodiment, in the second type of support 504, the glide strip 204 is provided with a slot 542 extending from the bottommost section 510, wherein the slot 542 of the glide strip 204 fits in a slot 540 of the second type of support.

In one embodiment, the conveyor rail further comprises a second metal rail 212, extending parallel to the first metal rail 214, wherein supports 502, 504 extend across the first and second metal rails at spaced intervals.

In one embodiment, the slots 536, 538, 540 are provided on a plurality of hangers 220 that are cut from the first metal rail 214, and the hangers are bent to extend from the first metal rail.

In one embodiment, the conveyor rail 214, 604, 704 further comprises single hangers 220, 608, 708 having one slot for the glide strip.

In one embodiment, the conveyor rail 604 further comprises double hangers comprising a first 610 and second 618 hanger, each hanger comprising a slot for the glide strip, wherein the first and second hangers are connected to each other via a side guide block support 614.

In one embodiment, a conveyor 100 comprises:

a rail system 200, 600, 700 comprising a first 208, 602, 702 and second 212, 604, 704 conveyor rail of the first rail embodiment placed on the right and left sides along the rail system 200, 600, 700; and a conveyor belt 102 resting on the topmost section 506 of the glide strips 204.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the infeed conveyor section 112, the outfeed conveyor section 116, and the return conveyor section 122 comprise the first and second conveyor rail of the first rail embodiment.

In a first guide block embodiment, a snap-on guide block 226 for a conveyor rail comprises:

an elongated monolithic elastic material having first 402 and second 404 separated congruent surfaces with first 406 and second 408 ends;

a cambered surface 410 extending between the first and second congruent surfaces; and a base surface 412 extending between the first and second congruent surfaces and separated from the cambered surface by the first and second congruent surfaces, wherein the first and second congruent surfaces each tapers at the first and second ends to an edge or rounded corner where the cambered surface meets with the base surface, and wherein the base surface includes at least one outward projecting snap-on key 4128 at a middle of the base surface.

In one embodiment, a durometer of the elastic material is from Shore A 60 to 90.

In one embodiment, the guide block 226 further comprises a second key 420 on the base surface 412 at the first end 406 and a third key 422 on the base surface 412 at the second end 408.

In one embodiment, the guide block 226 further comprises a first indentation 428 on the base surface 412 between the middle and the first end 406 of the base surface, and a second indentation 430 on the base surface 412 between the middle and the second end 408 of the base surface.

In one embodiment, the first 402 and second 404 congruent surfaces are parallel and flat.

In a second rail embodiment, a conveyor rail 200, 600, 700 comprises the guide block 226 according to the first guide block embodiment, and a first metal rail 222, 604, 704 having key holes or slots arranged along a length of the first metal rail, wherein the slots have a shape configured to receive at least the key in the middle of the guide block.

In one embodiment, the conveyor rail further comprises a second metal rail 224, 602, 702 extending parallel to the first metal rail 222, 604, 704 wherein a plurality of supports 216, 606, 706 extend across the first and second metal rails at spaced intervals.

In one embodiment, the conveyor rail further comprises double hangers comprising a first 610 and second 618 hanger, wherein the first and second hangers are connected to each other via a side guide block support 614.

In one embodiment, a conveyor 100 comprises:

a rail system 200, 600, 700 comprising a first 222, 604, 704 and second 224, 602, 702 conveyor rail of the second rail embodiment placed on the right and left sides along the rail system 200, 600, 700; and a conveyor belt 102 that travel adjacent the guide blocks 226.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the infeed conveyor section 112 and the outfeed conveyor section 116 comprise the first 604, 222 and second 602, 224 conveyor rail of the second rail embodiment, and wherein the cambered surface 410 of the guide blocks 226 is facing inward.

In one embodiment, the return conveyor section 122 comprises the first 704 and second 702 conveyor rail of the second rail embodiment, and wherein the cambered surface 410 of the guide blocks 226 is facing outward.

In a first nose block embodiment for a conveyor rail, the nose block 202 comprises:

an elongated monolithic elastic material having a constant cross-sectional shape throughout a majority of the material's length, wherein the cross-sectional shape comprises:

a top surface 234;

a bottom surface 236 separated from the top surface, wherein the top surface tapers to an edge 240 or rounded corner to join with the bottom surface, wherein the edge or rounded corner is along the material's length;

a middle surface 242 between the top and bottom surfaces;

a groove 244 between the middle and bottom surfaces, wherein the groove is facing opposite from the edge or rounded corner, and the groove extends along the material's length; and a first 246 and second 248 clip at a first and second end of the nose block, wherein the first and second clip extend from the top surface to the bottom surface to provide a gap 250 between the middle surface and each of the first and second clip.

In one embodiment, a durometer of the elastic material is from Shore A 60 to 90.

In one embodiment, the clips 246, 248 extend from the top surface 234 through a diagonal connecting arm 266 to horizontal arm 268 level with the bottom surface 236.

In one embodiment, the nose block 202 further comprises cutouts 272, 274 at the ends of the nose block to allow access to the clips 246, 248 to be able to depress the clips 246, 248 to disengage the clips 246, 248.

In a third rail embodiment, a conveyor rail 200 comprises the nose block 202 according to the first nose block embodiment, and a first 208 and second 212 metal rail connected to an intermediary metal bar 252 on left and right sides thereof, wherein the intermediary metal bar 252 is attached to the nose block 202 at the nose block groove 244 and clips, 246, 248.

In one embodiment, the intermediary metal bar 252 comprises a strip 270 to fit into the groove 244.

In one embodiment, the intermediary metal bar 252 comprises a left side and right side metal dog 256 that is engaged to the clips 246, 248.

In one embodiment, a conveyor 100 comprises:

a rail system comprising a conveyor rail 200 of the third rail embodiment; and a conveyor belt 102 that travels over the top of the nose block 202.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the outfeed conveyor section 116 comprises the conveyor rail 200 of the third rail embodiment, and wherein the nose block edge 240 is placed facing into a direction of the conveyor belt 102.

In a second embodiment of a glide strip for a conveyor rail, the glide strip 818 comprises:

an elongated monolithic elastic material having first 902 and second 904 separated congruent surfaces;

a convex surface 906 extending between the first and second congruent surfaces; and a concave surface 098 extending between the first and second congruent surfaces and separated from the convex surface by the first and second congruent surfaces, wherein the first and second congruent surfaces comprise first 910 and second 912 ends, wherein the first 902 and second 904 congruent surfaces taper from the second end 912 to the first rounded end 910 joining the convex surface 906 to the concave 908 surface, and wherein at the second end 912 of the first 902 and second 904 congruent surfaces, the concavity of the concave surface 908 increases to create a bend 914 of at least 90 degrees in the concave surface 908, and the concave surface 908 is joined to the convex surface 906 after the bend 914 of at least 90 degrees.

In one embodiment, a durometer of the elastic material is from Shore A 60 to 90.

In one embodiment, the first 902 and second 904 congruent surfaces are parallel and flat.

In one embodiment, the bend 914 is greater than 90 degrees to result in a hook at the second end 912.

In a fourth rail embodiment, a conveyor rail 800 comprises the glide strip 818 according to the second glide block embodiment, and a first 806 and second 808 metal rail connected to each other through spacers 814, and the glide strip 818 according to the second guide block embodiment rests on the spacers and between the first and second metal rail to raise a top surface of the glide block according to the second guide block embodiment above the first and second metal rail.

In one embodiment, the glide strip 818 according to the second glide block embodiment is hooked on a spacer.

In one embodiment, the first 806 and second 808 metal rail are congruent to each other.

In one embodiment, the first 806 and second 808 metal rail are parallel to each other.

In one embodiment, the conveyor rail comprises a second glide strip 820 according to the second glide strip embodiment that rests on the spacers 814 and between the first 806 and second 808 metal rail.

In one embodiment, the first 818 and second 820 glide strips according to the second glide block embodiment are congruent to each other.

In one embodiment, the first 818 and second 820 glide strips according to the second glide strip embodiment are parallel to each other.

In one embodiment, the first and second metal rail comprise;

a metal sheet having first 952 and second 954 separated congruent surfaces;

a convex surface 956 extending between the first 952 and second 954 congruent surfaces; and a concave surface 958 extending between the first 952 and second 954 congruent surfaces and separated from the convex surface 956 by the first 952 and second 954 congruent surfaces.

In one embodiment, a conveyor 100 comprises:

a rail system 800 comprising a first and second conveyor rail of the fourth rail embodiment placed on the right and left sides along the rail system; and a conveyor belt 102 that travels over the glide strip 818 according the second glide strip embodiment.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the downward directing conveyor section 110 comprises the first and second conveyor rail of the fourth rail embodiment.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a diagrammatical illustration of an outfeed rail section of the rail system of FIG. 1B for an outfeed conveyor section;

FIGS. 3A and 3B are side view illustrations of one embodiment of a nose block of the outfeed rail section of FIG. 2;

FIG. 4C is a top view illustration of the guide block of the outfeed rail section;

FIG. 6 is a diagrammatical illustration of an infeed rail section of the rail system of FIG. 1B for an infeed conveyor section;

DETAILED DESCRIPTION

Figure 1A:
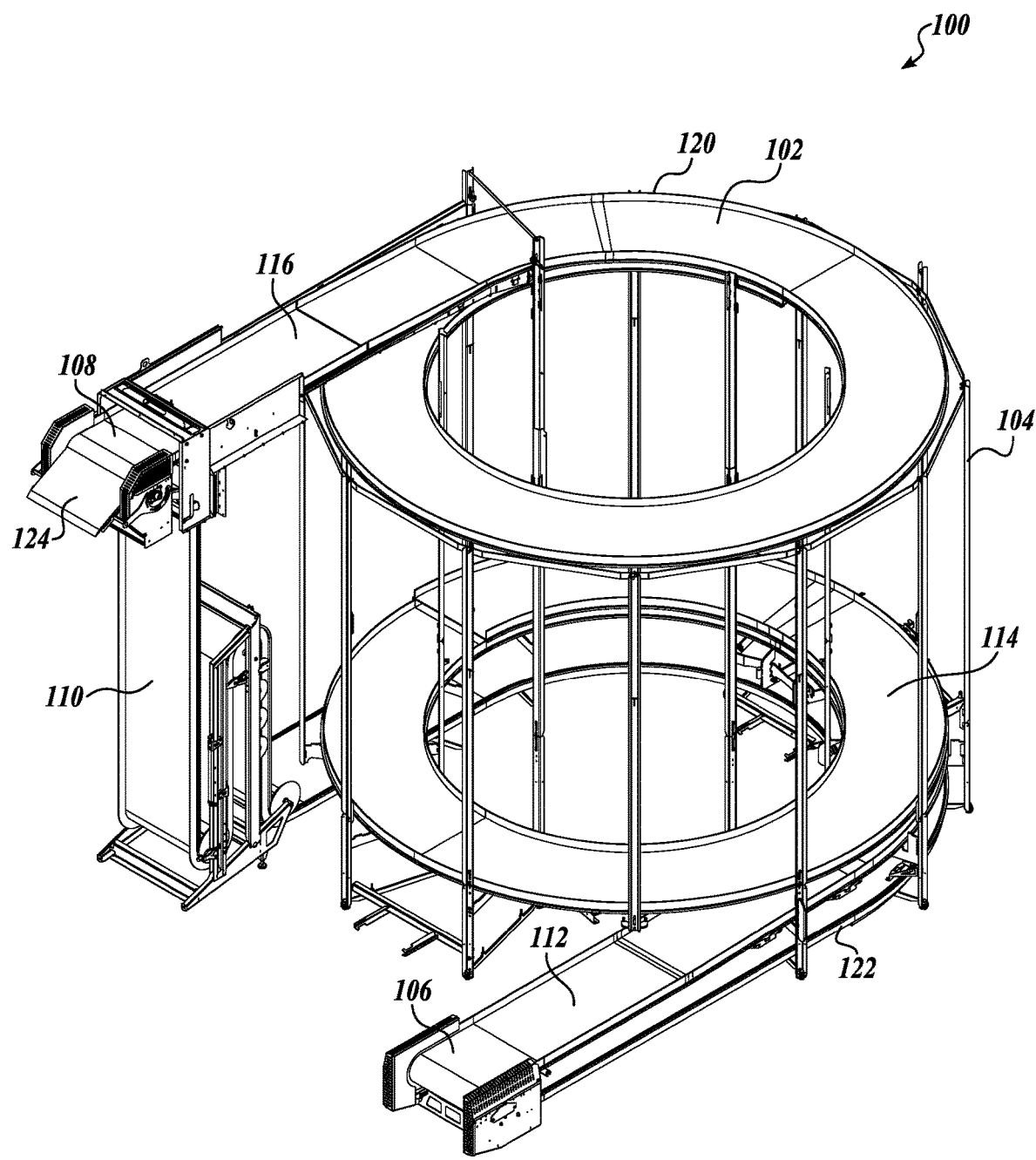
FIG. 1A is a diagrammatical illustration of one embodiment of a continuous loop belt conveyor.

FIG. 1A is an illustration of a spiral conveyor 100. The spiral conveyor 100 uses an endless loop conveyor belt 102 that is circulated repeatedly over conveyor rails to convey items from the infeed side 106 to the outfeed side 108. The spiral conveyor 100 includes an infeed conveyor section 112, a spiral conveyor section 114 from the infeed conveyor section 112; an outfeed conveyor section 116 from the spiral conveyor section 114; a downward directing conveyor section 110 from the outfeed conveyor section 116; and a return conveyor section 122 from the downward directing conveyor section 110, back to the infeed conveyor section 112.

A conveyor belt 102 is supported by different rail systems utilizing the same or different glide strips and guide blocks as the conveyor belt 102 traverses each of the conveyor sections. In one embodiment, a conveyor belt 102 is flexible and can bend sideways as it travels in a spiral or bend up or down as it travels over rollers. In one embodiment, a conveyor belt 102 can be comprised of plastic or metal links. In one embodiment, the conveyor belt 102 is channel shaped and has side walls 120 extending up from each side of the middle section.

One use for the spiral conveyor 100 is, for example, in a freezer used for the freezing of perishable food items. The perishable food items, for example, are loaded on the infeed side 106 of the conveyor 100. The items are carried upward by the conveyor 100 in spiral configuration to the outfeed side 108 while undergoing processing, such as freezing. After the items are removed at the outfeed side 108, the conveyor belt 102 is re-directed to return again to the infeed side 106.

In one embodiment, the conveyor belt 102 is directed downward at downward section 110 after the outfeed side 108, and then horizontally at a return conveyor section 122 to return to the infeed side 106. The conveyor belt 102 is supported on a rail system (hidden by belt 102), which can be supported on vertical support members 104.

Figure 1B:
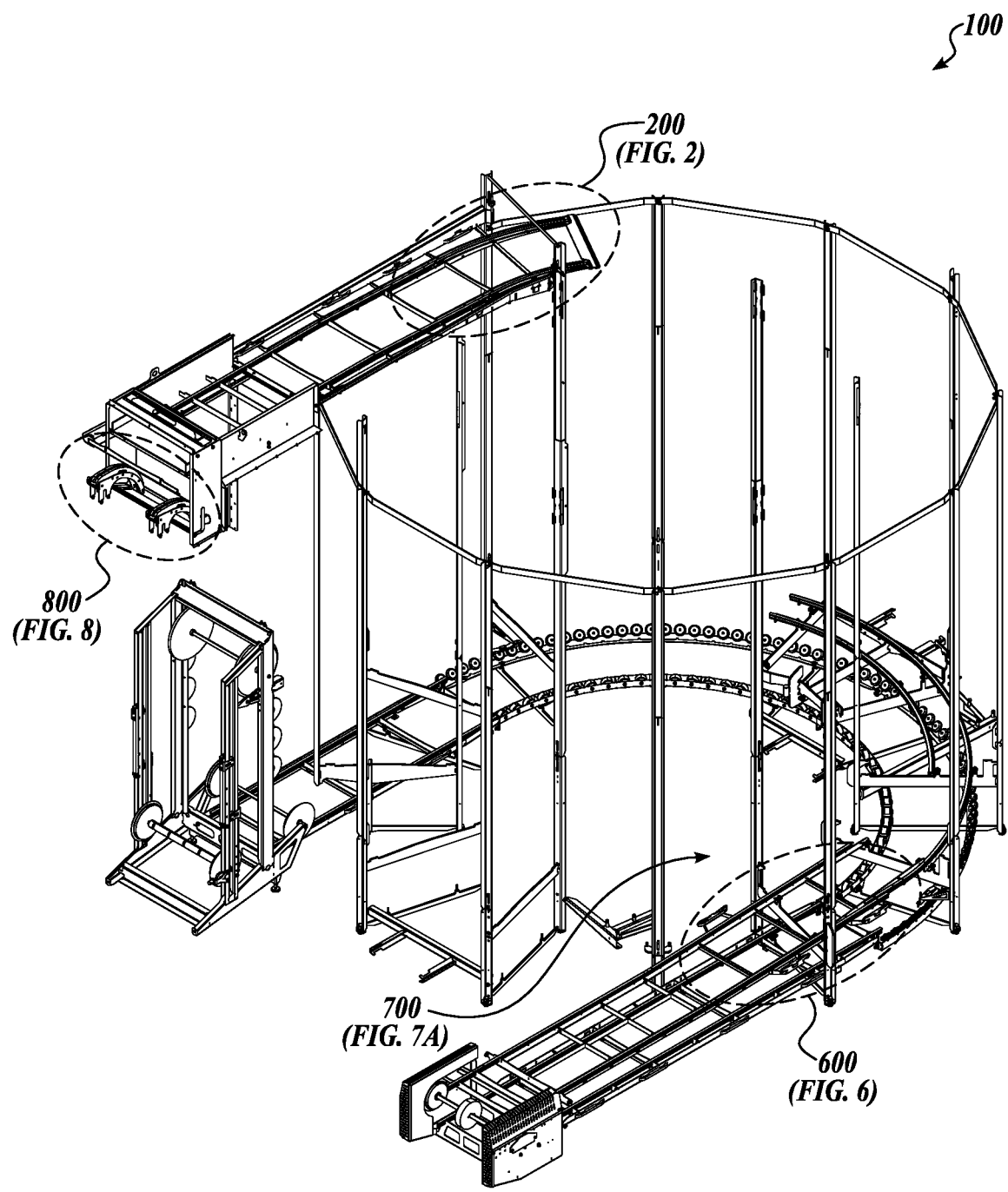
FIG. 1B is a diagrammatical illustration of one embodiment of belt-supporting rail system for the belt conveyor of FIG. 1.

FIG. 1B is an illustration of the conveyor 100 without the belt 102 in order to show some of the rail sections supporting the belt 102. Parts of the rail system of FIG. 1B are not being illustrated so as to more clearly show the rail sections according to this disclosure. In one embodiment, the rail system is comprised of at least four sections utilizing one or more glide strips and guide blocks supported on metal rails. In one embodiment, the four rail sections include the outfeed rail 200 (FIG. 2), the infeed rail 600 (FIG. 6), the return rail 700 (FIG. 7A), and the downward directing rail 800 (FIG. 8). While the foregoing rail sections are described in the context of a spiral conveyor, the use of the rail sections, glide strips, and guide blocks of this disclosure are not limited solely to spiral conveyors. The rail sections, glide strips, and guide blocks will be useful in other applications and configurations of conveyors.

Referring to FIG. 2, a section of the outfeed rail section 200 is illustrated. The location of the outfeed rail section 200 is near to the top of the spiral conveyor 100 of FIG. 1B. The outfeed rail section 200 has a nose block 202 as a leading end of the outfeed rail section 200, wherein the leading end is defined as facing into the direction of the moving belt 102. The trailing end of the outfeed rail section 200 ends before the chute 124 at the outfeed side 108 of the conveyor 100 (FIG. 1A) before the conveyor belt 102 is turned downward, for example.

In one embodiment, the outfeed rail section 200 includes a right side pair of inner rails 208 and 210 and a left side pair of inner rails 212, 214. Each pair of inner rails 208, 210 and 212, 214 is connected with the nose block 202 through an intermediary metal bar 252 connecting the inner rails 208, 210 to the inner rails 212, 214. In one embodiment, the pairs of inner rails 208, 210, and 212, 214, can each be an individual rail. However, in one embodiment, inner rails 208, 210 can be the respective two sides of a channel rail, and inner rails 212, 214 can be the respective two sides of a channel rail.

Figure 3C:
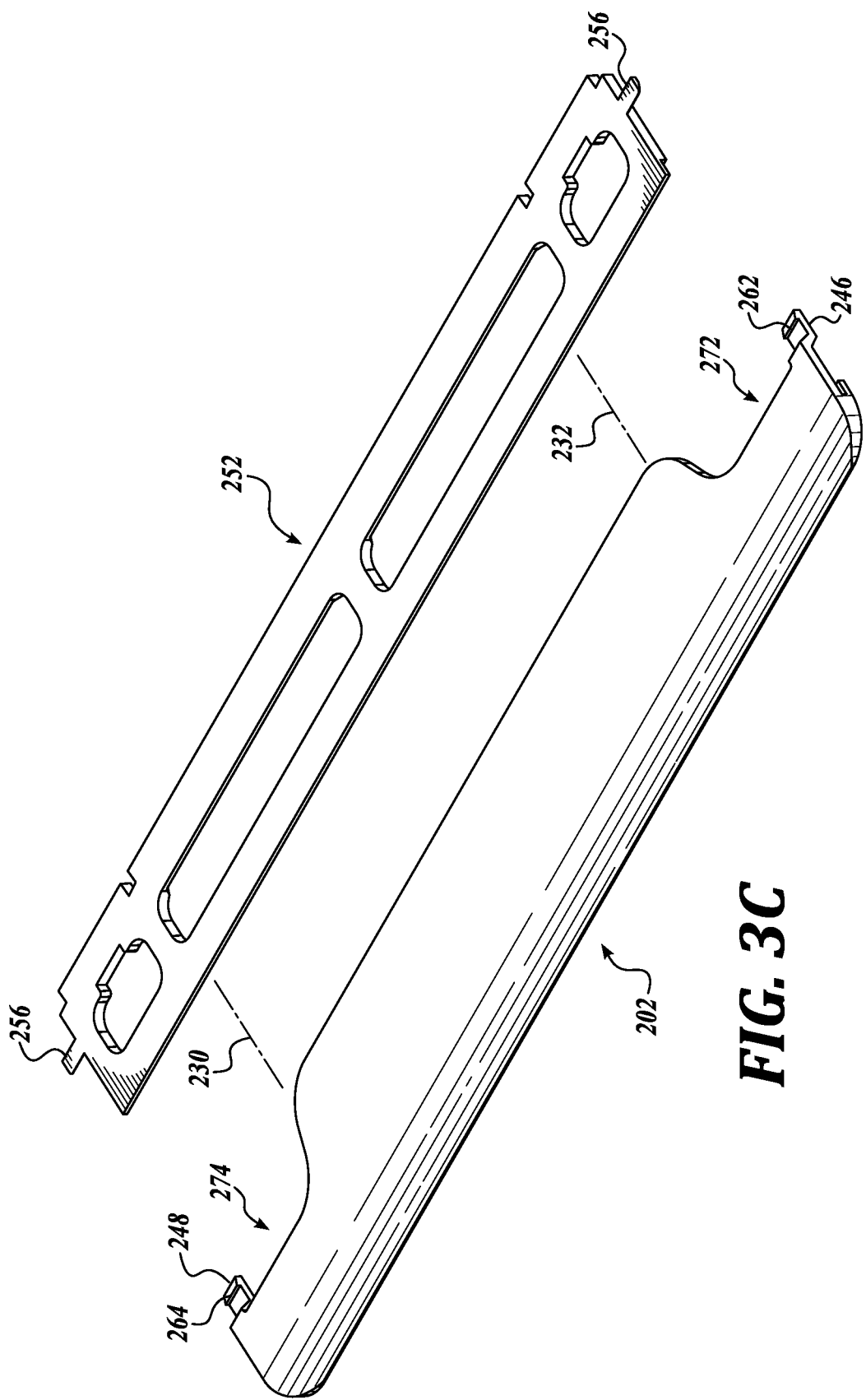
FIG. 3C is a top view illustration of the nose block of the outfeed rail section.

Referring to FIGS. 3A, 3B, and 3C, one embodiment of a nose block 202 is illustrated. A feature of the nose block 202 is the ease of cleaning to maintain hygienic conditions and the ease of replacement. For example, nose block 202 is configured to snap-on to the outfeed rail section 200 as described herein.

In one embodiment, the nose block 202 can be made from monolithic elastic material. In one embodiment the nose block 202 includes a substantially constant cross-sectional shape throughout a center of the material's length, such as from length 230 to length 232 (FIG. 3C). In one embodiment, to have a substantially constant cross-section shape means that any one or more dimensions do not vary by more than 10%, 20%, 30%, 40%, or 50%.

Referring to FIG. 3A, the cross-sectional shape comprises a top surface 234, a bottom surface 236 separated from the top surface 234, wherein the top surface 234 has a tapering shape 238 that comes to an edge or rounded corner 240 to join with the bottom surface 236, wherein the edge or rounded corner 240 extends along the material's length. The nose block 202 has a middle surface 242 between the top 234 and bottom 236 surfaces. The nose block 202 includes a groove 244 between the middle 242 and bottom 236 surfaces, wherein the groove 244 has an opening facing in the opposite direction from the edge or rounded corner 240, and the groove 244 extends along the material's length.

In one embodiment, the nose block 202 has a first 246 and second 248 clip at a first and second end of the material (FIG. 3C). Referring to FIG. 3A, the clip 246 (clip 248 being similar) extends from the top surface 234 through a diagonal connecting arm 266 to horizontal arm 268 level with the bottom surface 236. This provides a gap 250 between the first 246 and second 248 clip and the middle surface 242. In one embodiment, clip 246 has an upward projecting barb 262, and clip 248 has an upward projecting barb 264.

The nose block 202 is fastened to the inner rails 208, 210, 212, and 214 through the intermediary metal bar 252, which is connected to the right side pair 208, 210 and left side pair 212, 214 of inner rails, respectively at the right side and left side of the intermediary metal bar 252. Referring to FIG. 3A, the intermediary metal bar 252 is generally a flat shape with straight upper 258 and bottom 260 surfaces. The intermediary metal bar 252 includes a leading edge having a rabbet cut 254 on the bottom side leaving a thinner strip 270 along the edge of the intermediary metal bar 252, wherein the strip 270 can fit into the groove 244. Additionally, the intermediary metal bar 252 has a metal dog 256 projecting outward from each of the left and right side. The bottom surface of the metal dog 256 can have a ramp to slide against the barbs 262, 264 of the clips 246, 248.

Then, referring to FIGS. 3A and 3B, it can be seen that the nose block 202 is engaged into the intermediary metal bar 252 when the strip 270 of the intermediary metal bar 252 slides into the groove 244 on the nose block 202, and the clips 246, 248 on each side of the nose block 202 engage the metal dogs 256 on each side of the intermediary metal bar 252.

Referring to FIG. 3C, in one embodiment, the nose block 202 has cutouts 272, 274 at the ends which allows access to the clips 246, 248 to be able to depress the clips 246, 248 to disengage the clips 246, 248 from the metal dogs 256, and pull off the nose block 202. Additionally, inner rails 208, 210, 212, and 214 connect to the intermediary bar 252 in this area, and the cutouts 274, 272 can provide access for cleaning.

Referring to FIG. 3B, once the nose block 202 is fitted to the intermediary bar 252, it can be seen that the top surface 234 of the nose block 202 is above the top surface of inner rail 210 and the rails 208, 212, 214. Further, the top surface 234 of the nose block 202 is generally at the level of a plastic glide strip 205.

Figure 4A:
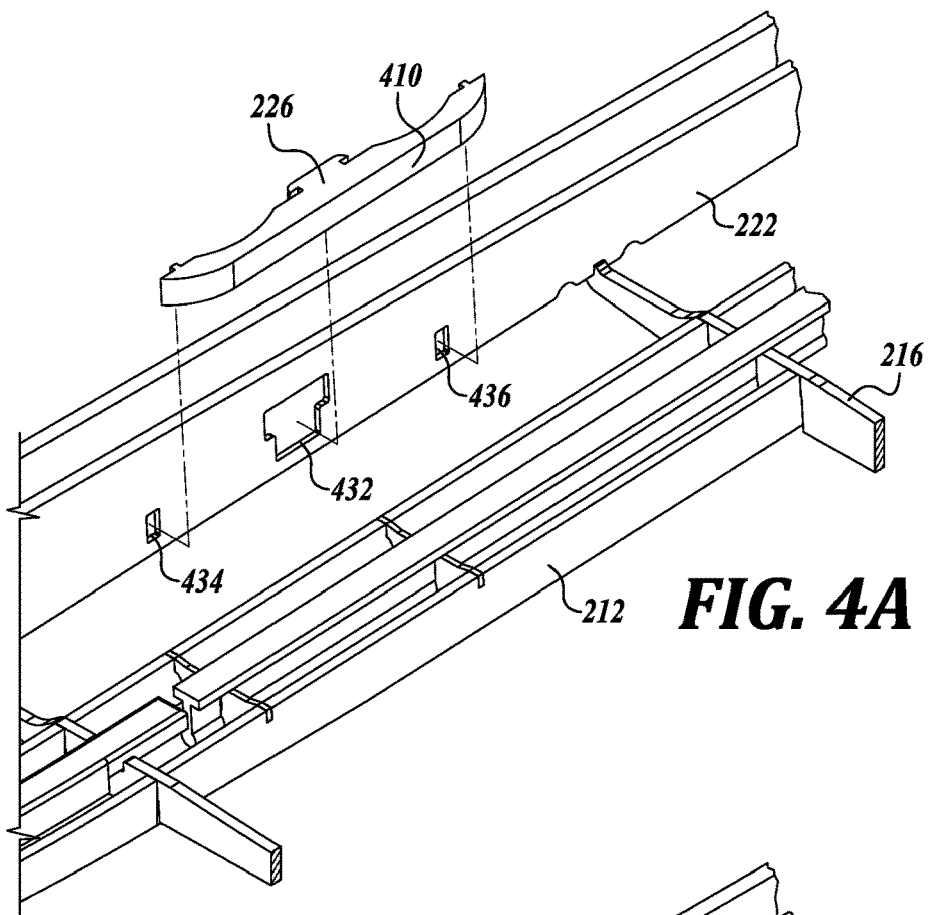
FIGS. 4A and 4B are close-up illustrations of the outfeed rail section of FIG. 2 showing one embodiment of a guide block.
Figure 4B:
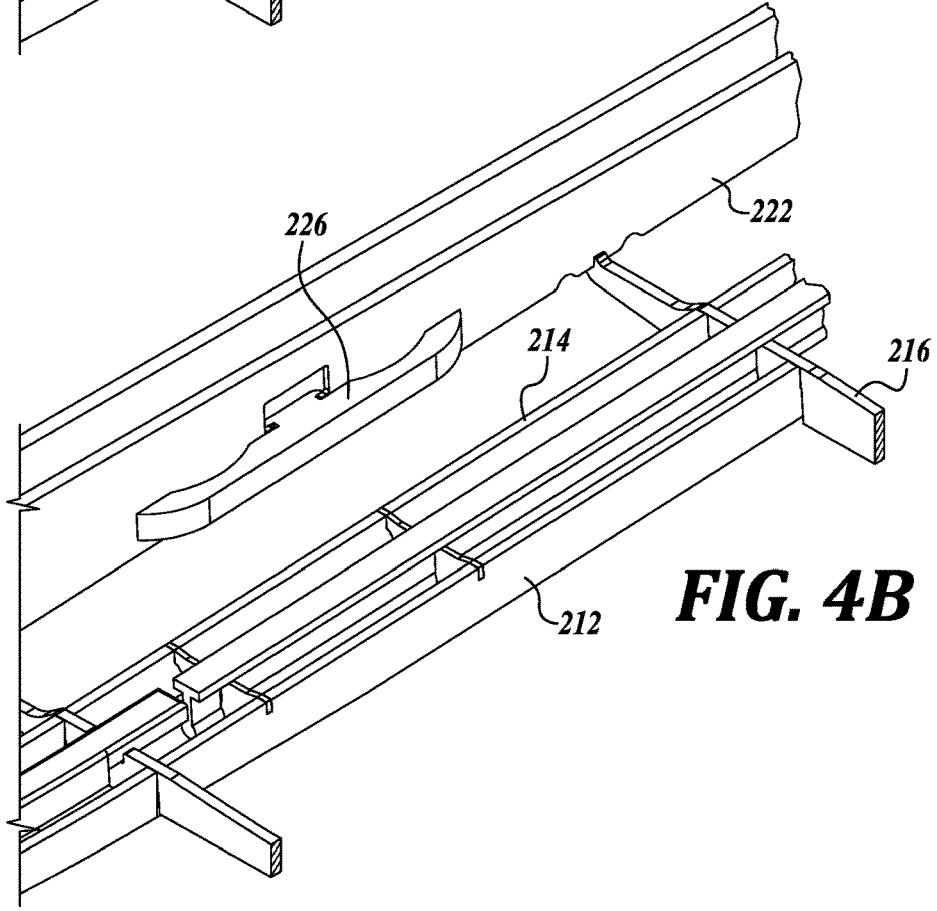

Referring to FIG. 2, the outfeed section has a pair of outer metal rails 222 and 224 that extend along and outside of each pair of inner rails 212, 214, and 208, 210. Referring to FIGS. 4A and 4b showing only the left outer rail 222, the right outer rail 224 being similar, the rail 222 can be an inverted channel rail or box rail to add lateral strength, for example. In particular, the left and right outer rails 222, 224 have vertical walls which are provided with side guide blocks 226 along the lengths of the vertical walls. As with the nose block 202, the side guide block 226 is designed with features to improve the ease of cleaning for hygienic reasons and ease of replacement. In one embodiment, the guide block 226 guides the sides of the channel shaped conveyor belt 102.

Referring to FIG. 4C, one embodiment of a guide block 226 is illustrated. While the guide block 226 is described as being used for the side rails, further described below is the same guide block being used to guide the bottom side of the inverted conveyor belt. In one embodiment, a snap-on side guide block 226 is made from an elongated monolithic elastic material. The guide block 226 includes a first 402 and second 404 separated congruent surfaces with first 406 and second 408 ends. In one embodiment, first 402 and second 404 surfaces can be flat parallel surfaces.

The guide block 226 includes a cambered surface 410 extending between and joining the first 402 and second 404 congruent surfaces. In one embodiment, the cambered surface 410 is an orthogonal surface with respect to both first 402 and second 404 surfaces.

The guide block 226 includes a base surface 412 extending between the first 402 and second 404 congruent surfaces and separated from the cambered surface 410 by the first 402 and second 404 congruent surfaces. In one embodiment, the base surface 412 is an orthogonal surface with respect to both first 402 and second 404 surface.

In one embodiment, the first 402 and second 404 congruent surfaces each tapers at the first 406 and second 408 ends to an edge (or rounded corner) 414, 416, respectively, where the cambered surface 410 meets with the base surface 412.

In one embodiment, the base surface 412 includes at least one outward projecting snap-on key 418 at a middle of the base surface 412. In one embodiment, the base surface 412 includes a second and third outward projecting key 420, 422, respectively at the first 406 and second 408 ends.

In one embodiment, the key 418 extends from the first 402 to the second 404 congruent surfaces. In one embodiment, the snap-on key 418 includes a first slot 424 of constant depth extending from the first 402 to the second 404 congruent surface. In one embodiment, the snap-on key 418 includes a second slot 426 of constant depth extending from the first 402 to the second 404 congruent surface, wherein the second slot 426 is placed directly opposite from the first slot 424.

In one embodiment, the second key 420 and third key 422 have a constant rectangular cross section from the first 402 to the second 404 congruent surfaces.

While representative keys are illustrated from the center and ends of the guide block 226, other embodiments of outward projecting keys are within the scope of this disclosure. For example, outward projecting keys can have rounded heads, mushroom type barbs, with forward and rearward sloping ramps, or outward projecting keys can have wedges to tighten the further the key is inserted into a corresponding key hole.

In one embodiment, the base surface 412 includes indented surfaces 428 and 430, wherein one indented surface is provided between the center key 418 and one of the respective ends 406, 408. The indented surfaces 428, 430 minimizes the overlapping of surfaces to improve the ease of cleaning and to maintain hygienic conditions. Also, the indentations make the guide block thinner and thereby more flexible. This flexibility facilitates mounting the guide blocks in place. In one embodiment, the indented surfaces 428, 430 are concave shaped indentations.

Referring to FIGS. 4A and 4B, the side guide block 226 is shown being placed on the outer left rail 222. For this purpose, for each one of the side guide blocks 226 that is to be attached to the outer left rail 222, the rail 222 has a center key hole 432 and two side key holes 434, 436, for the center key 418 and the two end keys 420 and 422. The key hole 432 for the center key 418 is about twice the height of the key 418, i.e., about the height of the base surface 412 or the distance between the first 402 and second 404 congruent surfaces. The upper half of the key hole slot 432 is longer than the length of the key 418. The lower half of the key hole 432 is about the length of the key 418 as measured at the first 424 and second 426 slots.

The height of the two side holes 434, 436 greater than the height of the respective keys 420, 422, i.e., about the height of the base surface 412 or the distance between the first 402 and second 404 congruent surfaces. The length of the two side holes 434, 436 is about the length of the respective keys 420, 422. Although, in one embodiment, the two side key holes 434, 436 generally correspond in size to the size of the keys 420, 422, the side key holes 434, 436 can be made larger to account for thermal expansion differences between metal and plastic, or can be made smaller so that the keys 420, 422 require some force to be inserted for better holding, such as when the keys 420, 422 are made with barbs, for example.

Therefore, the side guide block 226 is placed on the left outer rail 222 by inserting the center key 418 horizontally first through the upper wider half of the center key hole 432, and then forcing the center key 418 downward so that the slots 424, 426 of the center key 418 catch on the edges of the lower narrower half of the center key hole 432. The guide block 226 ends 408, 406 being generally made from elastic materials will bend slightly, until the first 420 and second 422 keys are inserted into the respective keyholes 434, 436.

The guide blocks 226 will generally be higher in elevation from the glide strip 204 to add lateral support to the conveyor belt 102 side walls 120.

As described in association with FIG. 2, the outfeed rail section 200 included left and right pairs of inner rails disposed respectively on the left and right sides of the conveyor 100. Next, referring to FIGS. 5A and 5B, the left pair of inner rails 212, 214 and a glide strip 204 will be described, the right pair of inner rails 208, 210 being similar.

Inner rails 212 and 214 can be any configuration. In the illustrated embodiment, rails 212 and 214 are metal strips with rectangular cross section, wherein the height dimension is greater than the width dimension.

As shown in FIG. 2, inner rails 212, 214 are connected to each other with transverse bars 216 that not only connect the left pair of inner rails 212, 214, but the transverse bars 216 extend to connect to the right pair of inner rails 208, 210. Transverse bars 216 extend even further from the pairs of inner rails to the respective left and right outer rails 222, 224, which support the transverse bars 216. A plurality of transverse bars 216 are spaced throughout the length of the outfeed rail section 200.

Figure 5A:
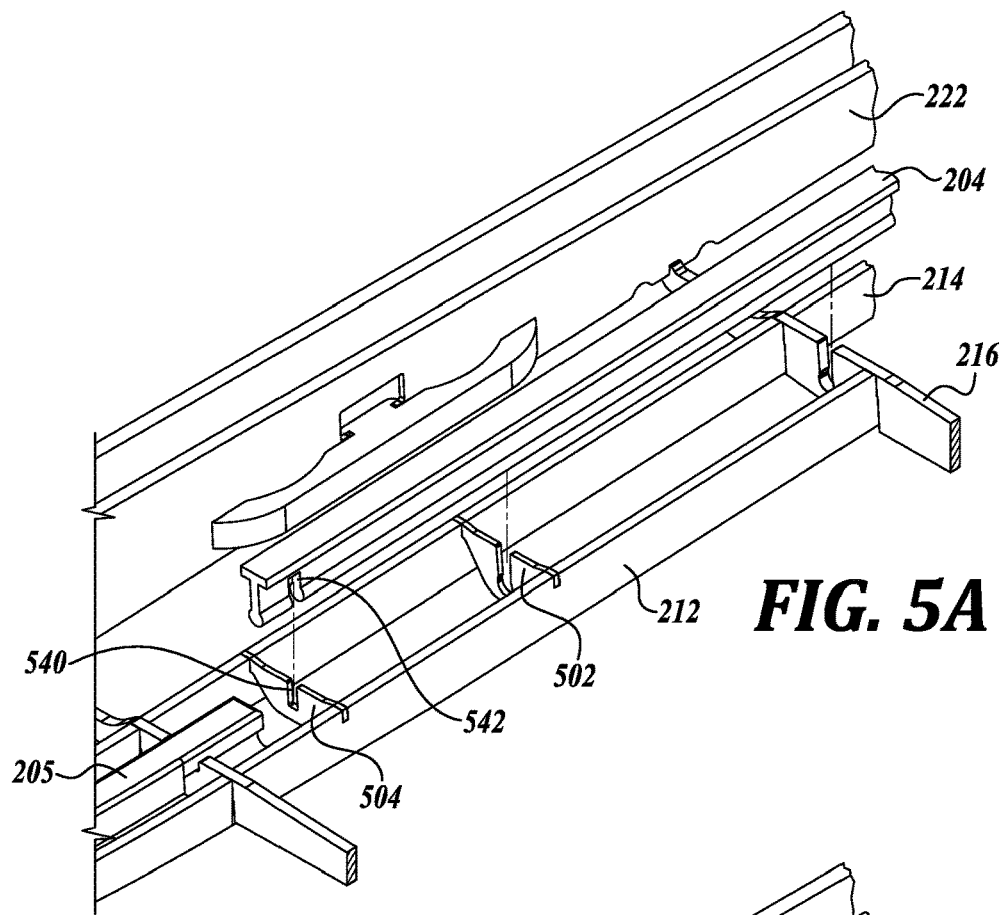
FIGS. 5A and 5B are close-up illustrations of the outfeed rail section of FIG. 2 showing one embodiment of a glide strip.
Figure 5B:
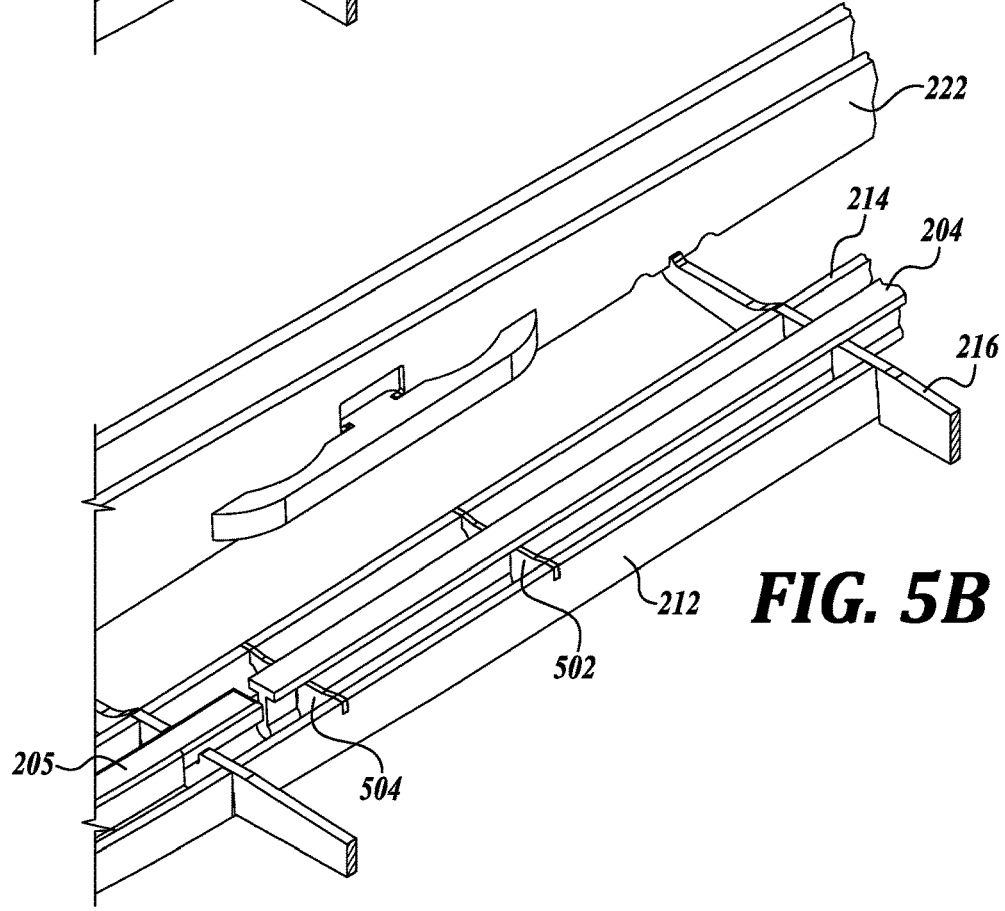

Referring to FIGS. 5A and 5B, the first 212 and second 214 inner rails are further connected by a plurality of glide strip supports 502, 504 that extend across from the first 212 and second rail 214 and only cross from one of the pair of inner rails to the other.

Figure 5C:
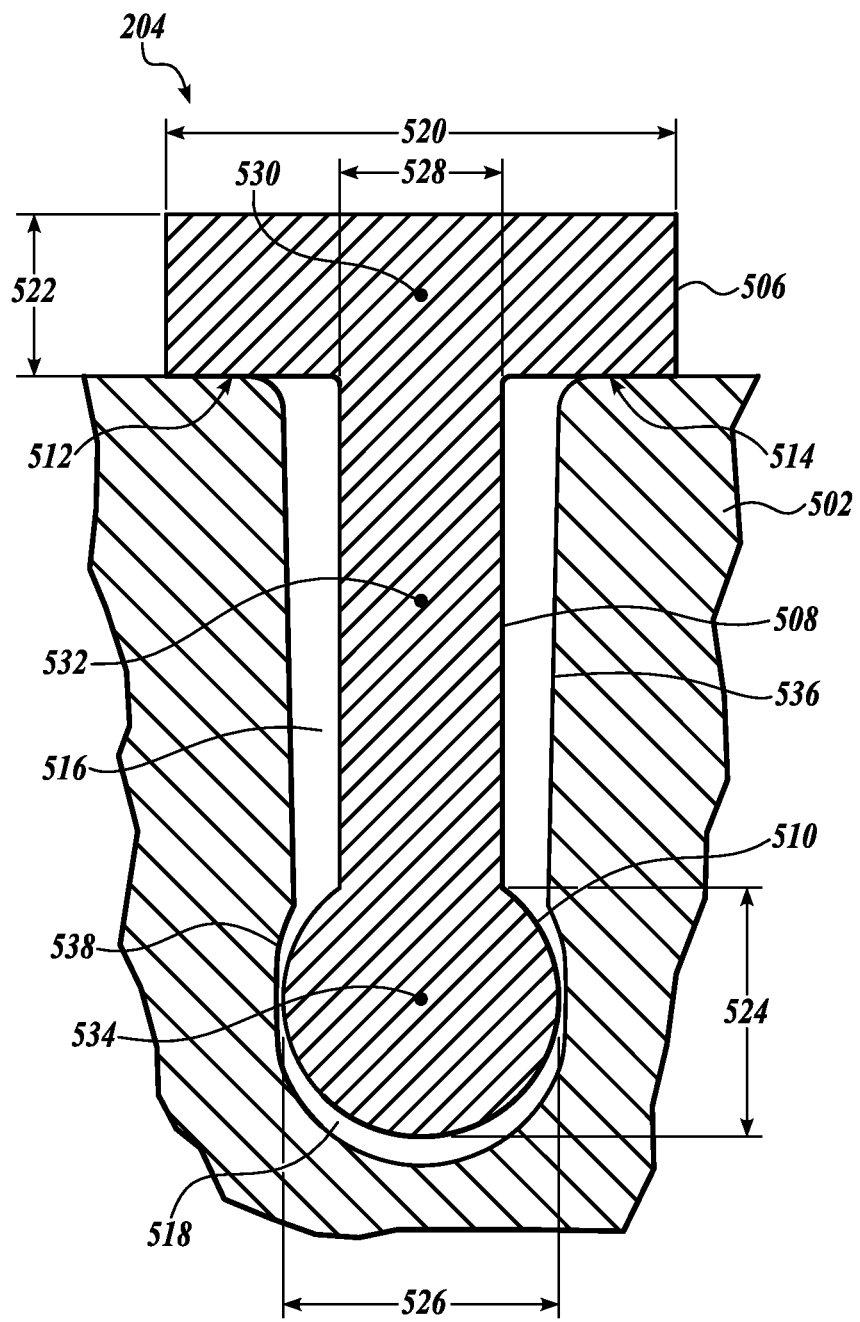
FIG. 5C is a cross sectional illustration of the glide strip of the outfeed rail section.

Referring to FIG. 5C, one embodiment of a glide strip 204 is illustrated in a first type of glide strip support 502. In one embodiment, the glide strip 204 includes an elongated monolithic elastic material having a constant cross-sectional shape throughout a majority of the material's length. In one embodiment, the cross-sectional shape comprises a topmost section 506 having a first width 520 perpendicular to the material's length and a first height 522, a bottommost section 510 having a second width 526 perpendicular to the material's length and a second height 524, wherein the second width 526 is less than the first width 520, and a middle section 508 having a third width 528, wherein the middle section 508 connects the topmost section 506 to the bottommost section 510, wherein the first width 520 is greater than the second width 526, and the second width 526 is greater than the third width 528, and the bottommost section 510 snaps on within slots connected to the rails 212, 214.

In one embodiment, the topmost section 506 has an aspect ratio (width to height) from 1:1 to 5:1. In one embodiment, the topmost cross section 506 is a rectangle.

In one embodiment, an aspect ratio of the middle section 508 is from 1:1 to 1:5. In one embodiment, the middle cross section 508 is a rectangle.

In one embodiment, an aspect ratio of the bottommost section 510 is about 1:1. In one embodiment, the bottommost cross section 510 is circular.

In one embodiment, centroids 530, 534, 532 of the topmost 506, bottommost 510, and middle sections 508 pass through a straight line.

In FIG. 5C, the glide strip 204 is illustrated inserted into the first type of glide strip support 502. A glide strip support of the first type 502 has a slot with two different widths. In one embodiment, the glide strip support 502 is generally made from a flat piece of metal to connect the first 212 and second 214 inner rails to each other. In one embodiment, a bottom slot section 538 is as wide or only slightly wider than the bottommost glide strip section 510. Above the bottom slot section 538, there is a top slot section 536 that is narrower than the glide strip bottommost glide strip section 510. In one embodiment, the top slot section 536 is narrower than the bottom slot section 538 where it is joined to the bottom slot section 538. In one embodiment, the top slot section 536 tapers from a greater width to the narrower width where it joins the bottom slot section 538. Further, the combined height of the bottom slot section 538 plus the top slot section 536 is greater than the combined height of the glide strip middle 508 and bottommost 510 sections. A glide strip support 502 of the first type can resist upward forces that would pull up the glide strip 204 from the rails.

The above-described widths and heights of the glide strip 204 and the glide strip support 502 of the first type provides for several features. The glide strip bottommost section 510 being elastic allows it to be compressed when passing through the top slot section 536, but then snaps into place when entering the bottom slot section 538. The widths of the top 536 and bottom 538 slot sections allows a gap 516 on the sides of the glide strip middle section 508, and a gap 518 on the sides and bottom of the glide strip bottommost section 510. The gaps 516, 518 minimize overlapping/contacting surfaces since they are difficult to clean and bad from a hygiene perspective. Also, the combined height of the slot sections 536, 538 being greater than the middle and bottommost sections 508, 510 puts the load points (weight bearing) on the right and left undersides 512, 514 of the glide strip topmost section 506. In the mounted position, the contacting surfaces 512, 514 between the glide strip 204 topmost section 506 and the glide strip support 502 are the load points. Along the rest of the glide strip 204 there are gaps from the metal support 502, so when cleaning, detergent can penetrate and rinse water can be flushed through the gaps 516, 518.

Referring to FIG. 5A, a glide strip support of the second type 504 is illustrated. A glide strip support 504 of the second type includes a straight slot 540 starting at the upper edge of the glide strip support 504 to a depth about halfway or more or less from the bottom edge of the glide strip support 504. The straight slot 540 is at least as wide or wider than the width of the middle section 508 of the glide strip 204. A wider slot 540 will provide gaps for cleaning. To engage with the glide strip support 504, a slot 542 is also provided on the glide strip 204 starting from the bottommost section edge up to a height sufficient so that the glide strip 204 fits into the support 504 such that the undersides of the topmost section 506 of the glide strip 204 receive the weight load, and a gap can be provided between the bottom of the glide strip 204 and the bottom of the slot 540 of the support 504. Therefore, part of the middle section 508 and the bottommost section 510 from the glide strip 204 can abut against the glide strip support 504 that has not been cut to prevent forward and backward sliding of the glide strip 204 in the rails.

In one embodiment, glide strip supports of the first type 502 can alternate with glide strip supports of the second type 504 to secure the glide strip 204 to the pair of inner rails from being pulled up and from moving forwards and backwards.

Further, the transverse bars 216 can also be provided with the above described slots to function as glide strip supports of the first type 502 or the second type 504.

In one embodiment, the glide strip 204 is supported by a single rail, for example, from the "outer" rail 214 of the pair of inner rails 212, 214. As illustrated in FIG. 2, the rail 214 extends beyond the termination of the "inner" rail 212 of the pair. In one embodiment, where a single rail is used to support the glide strip 204, a plurality of hangers 220 support the glide strip 204 to the rail 214. The hangers 220 can be cut out from the rail 214 itself and bent perpendicular, or the hangers 220 can be welded to the rail 214. The hangers 220 can have similar slots as the glide strip supports of the first type 502 and the second type 504 discussed above.

Referring to FIGS. 5A and 5B, a second separate glide strip 205 is provided adjacent to the end of the glide strip 204. The glide strip 205 can have a similar configuration as glide strip 204, or glide strip 205 can have a rectangular cross section, since glide strip 205 extends for a short distance from the end of the glide strip 204 to the nose block 202 as illustrated in FIG. 2. Glide strips 204 can be provided in discrete lengths, where separate glide strips 204 are juxtaposed end to end to cover the desired length of rail.

The glide strip 204 is used to support any type of conveyor belt 102, such as a belt or a chain link conveyor made of metal or plastic. A feature of the glide strip 204 is to allow easier cleaning, for example, to eliminate contact surfaces that can lead to unhygienic conditions. The glide strip 204 is placed so that a top surface of the glide strip 204 is above a top surface of the rail or rails to which the glide strip 204 is attached.

Referring to FIG. 6, an infeed rail section 600 is illustrated. The infeed rail section 600 is used at the infeed side 106 to the conveyor 100 as shown in FIGS. 1A and 1B. The infeed rail section 600 uses glide strips and guide blocks similar to the glide strip 204 (FIG. 5C) and guide block 226 (FIG. 4C). Accordingly, similar reference numerals will be used to designate similar parts.

The infeed rail section 600 includes a first rail 602 connected to a second rail 604. Rails 602, 604 can be metal and can have any shape to provide the strength required for the application. In addition to solid rectangular rails, rails 602, 604, can be channel rails, box rails, or the like. The first 602 and second 604 rails are rigidly connected to each other through a plurality of transverse bars 606, spaced at designated intervals, and positioned perpendicular to rails 602, 604. Each rail 602, 604 is providing support to a glide strip 204. However, more than one rail per side can be used to a single glide strip 204 as in the outfeed rail section 200.

In one embodiment, the glide strips 204 are provided on the outer side of the rails 602, 604. However, in one embodiment, the glide strips 204 can be provided on the inner side of the of the rails 602, 604, or one rail can have a glide strip on the inner side, while the second rail has the glide strip on the outer side.

FIG. 6 also illustrates that in some embodiments glide strips 204 can have overlapping ends when one glide strip ends and another begins, instead of abutting end to end.

The rails 602, 604 include a plurality of hangers of a first type 608 and a plurality of hangers 610 of a second type. The first type of hanger 608 is a short flat metal piece that is projecting perpendicular to the rail to which the hanger 608 is attached. The hangers 608 can be provided with a slot similar to either glide strip supports of the first type 502 (FIG. 5C) or second type 504 (FIG. 5A). The single hangers of the first type 608 can be welded or bolted to the rails 602, 604.

The hangers of the second type 610 first extend perpendicularly to the rails 602, 604 and are provided with a slot of the first 502 or second 504 type for supporting the glide strip 204. Then, from the perpendicular section, the hangers 610 extend to a first diagonal section 612 to connect with a first side of a longitudinal section 614 used for supporting a side guide block 226. Then, the second side of the longitudinal section 614 is connected to a second diagonal section 616, and the second diagonal section 616 is connected to a second hanger of the second type 610 connected to the rail. The longitudinal section 614 is provided with key holes or slots to support a guide block 226, wherein the cambered surface of the guide block 226 is facing in. In one embodiment, instead of key holes, straight cut slots corresponding to the width of the guide block keys 418, 420, and 422 replace the key holes of FIGS. 4A and 4B. Guide blocks 226 can be placed to the sides of both rails 602, 604 to maintain the conveyor belt 102 within a predetermined lateral space. The double hangers of the second type therefore have two connected hangers to support the glide strip 204 and a guide block 226. Similarly, the double hangers of the second type be provided with a slot similar to either glide strip supports of the first type 502 (FIG. 5C) or second type 504 (FIG. 5A). The double hangers of the second type 610 can be welded or bolted to the rails 602, 604.

The guide blocks 226 will generally be higher in elevation from the glide strip 204 to add lateral support to the conveyor belt 102 side walls 120.

Figure 7A:
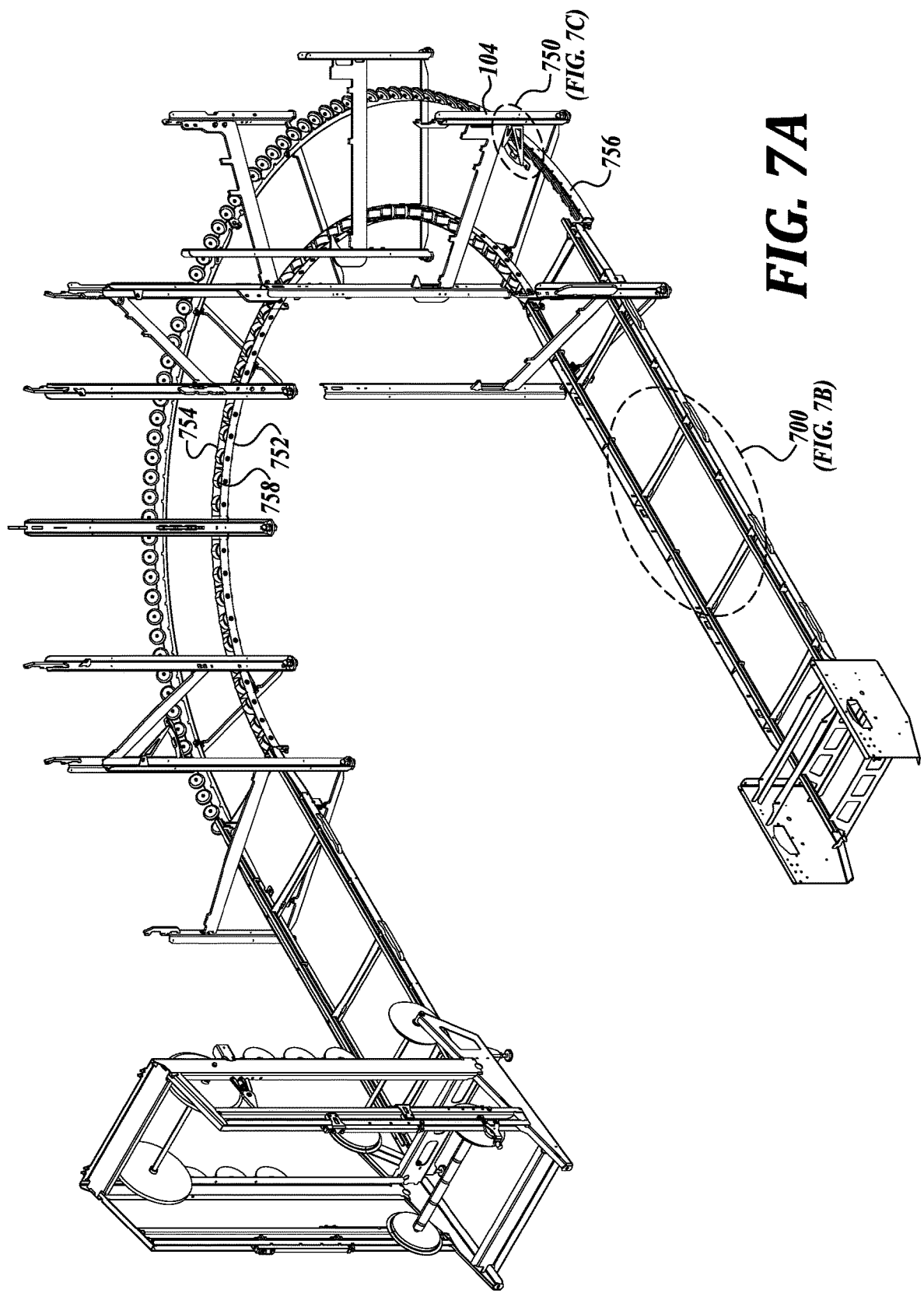
FIG. 7A is a diagrammatical illustration of a return rail section of the rail system of FIG. 1B for a return conveyor section.
Figure 7B:
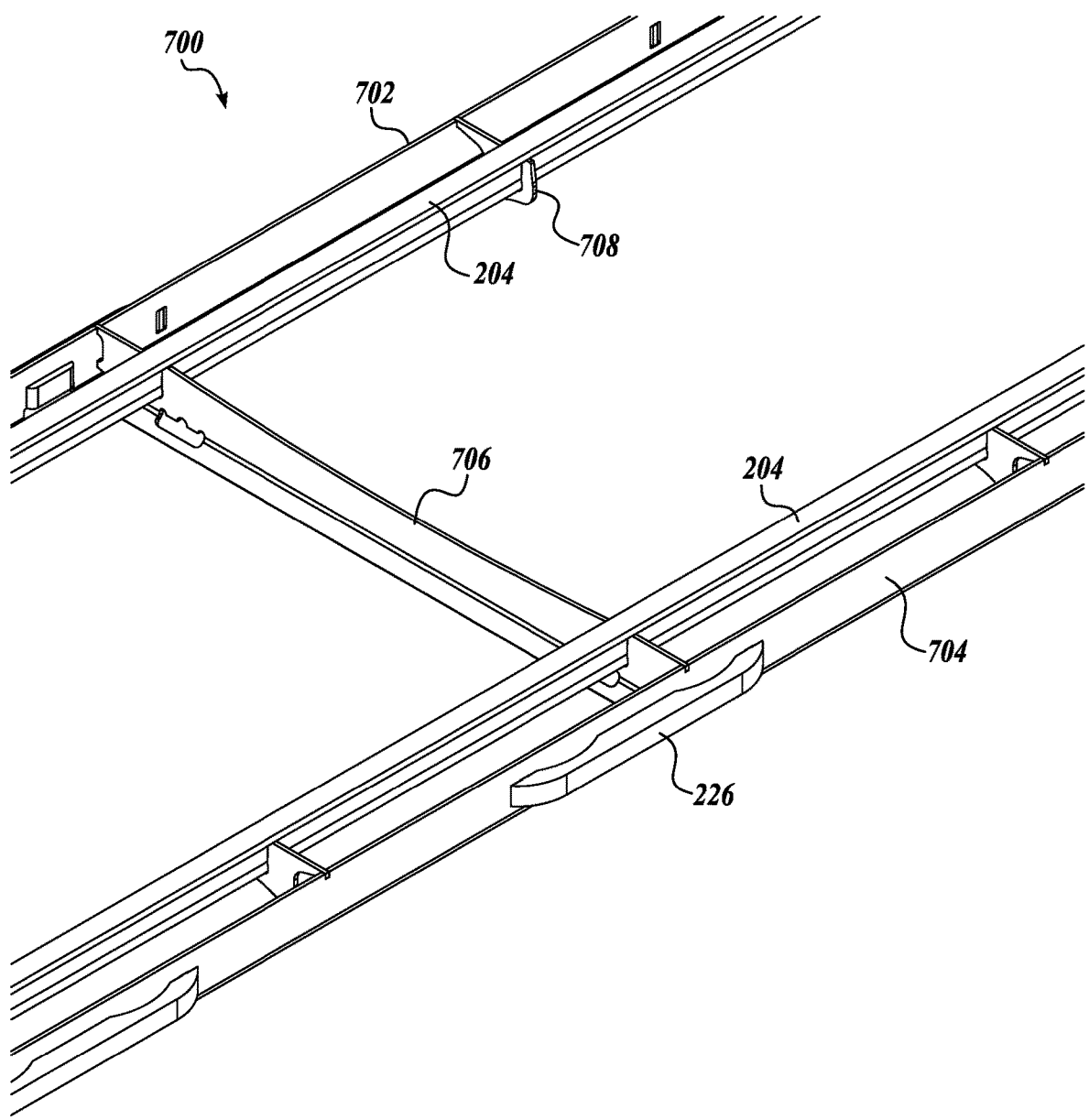
FIG. 7B is a diagrammatical illustration of a straight section of the return rail section of FIG. 7A.
Figure 8:
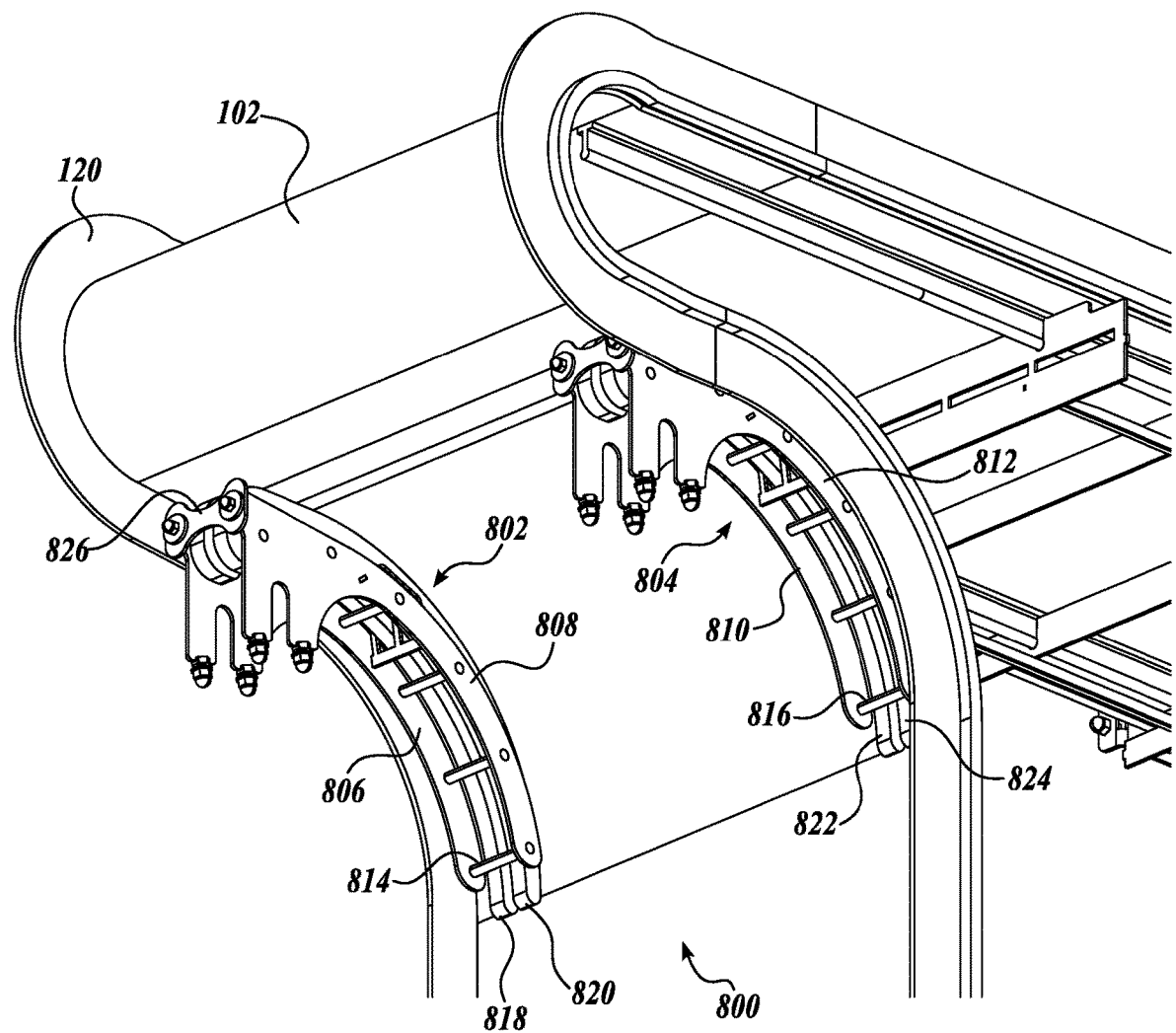
FIG. 8 is a diagrammatical illustration of a downward directing rail of the rail system of FIG. 1B for an downward directing conveyor section.

Referring to FIGS. 7A and 7B, a return rail section 700 is illustrated. The return rail section 700 is one of several structures for returning the conveyor belt 102 from the outfeed side 108 to the infeed side 106 of the conveyor 100 as shown in FIGS. 1A and 1B. The return rail section 700 uses glide strips and guide blocks similar to the glide strip 204 (FIG. 5C) and guide block 226 (FIG. 4C). Accordingly, similar reference numerals will be used to designate similar parts. Further, the conveyor belt 102 will be inverted, upside down from the normal orientation that is used for conveying items.

The return rail section 700 includes a first rail 702 connected to a second rail 704. Rails 702, 704 can be metal and can have any shape to provide the strength required for the application. Rails 702, 704, can be channel rails, box rails, or bar rails. The first 702 and second 704 rails are rigidly connected to each other through a plurality of transverse bars 706, spaced at designated intervals, and positioned perpendicular to rails 702, 704. Each rail 702, 704 is providing support to a glide strip 204. However, more than one rail can provide support to a single glide strip as in the outfeed rail section 200.

In one embodiment, the glide strips 204 are provided on the inner side of the rails 702, 704. However, in one embodiment, the glide strips 204 can be provided on the outer side of the of the rails 702, 704, or one rail can have a glide strip on the inner side, while the second rail has the glide strip on the outer side.

The rails 702, 704 support the glide strips 204 through the use of hangers 708 extending perpendicular to the respective rail to which the hanger 708 is connected. The hangers 708 are provided with a slot similar to glide strip supports of the first type 502 (FIG. 5C) and second type 504 (FIG. 5A). The hangers 708 can be welded or bolted to the rails 702, 704.

Additionally, the transverse bars 706 can also provide glide strip support. Transverse bars 706 are provided with a slot similar to glide strip supports of the first type 502 (FIG. 5C) and second type 504 (FIG. 5A).

The rails 702, 704 are also provided with key holes as described in connection with FIG. 4A to receive a guide block 226, wherein the cambered surface of the guide block 226 is facing out. In the return rail section, the conveyor belt 102 is inverted and is not carrying items, so the guide blocks 226 can guide the inside of the conveyor belt side walls 120. Also, since the conveyor belt 102 is inverted, the side walls 120 are lower, and the guide blocks 226 will be lower in elevation from the glide strip 204.

Figure 7C:
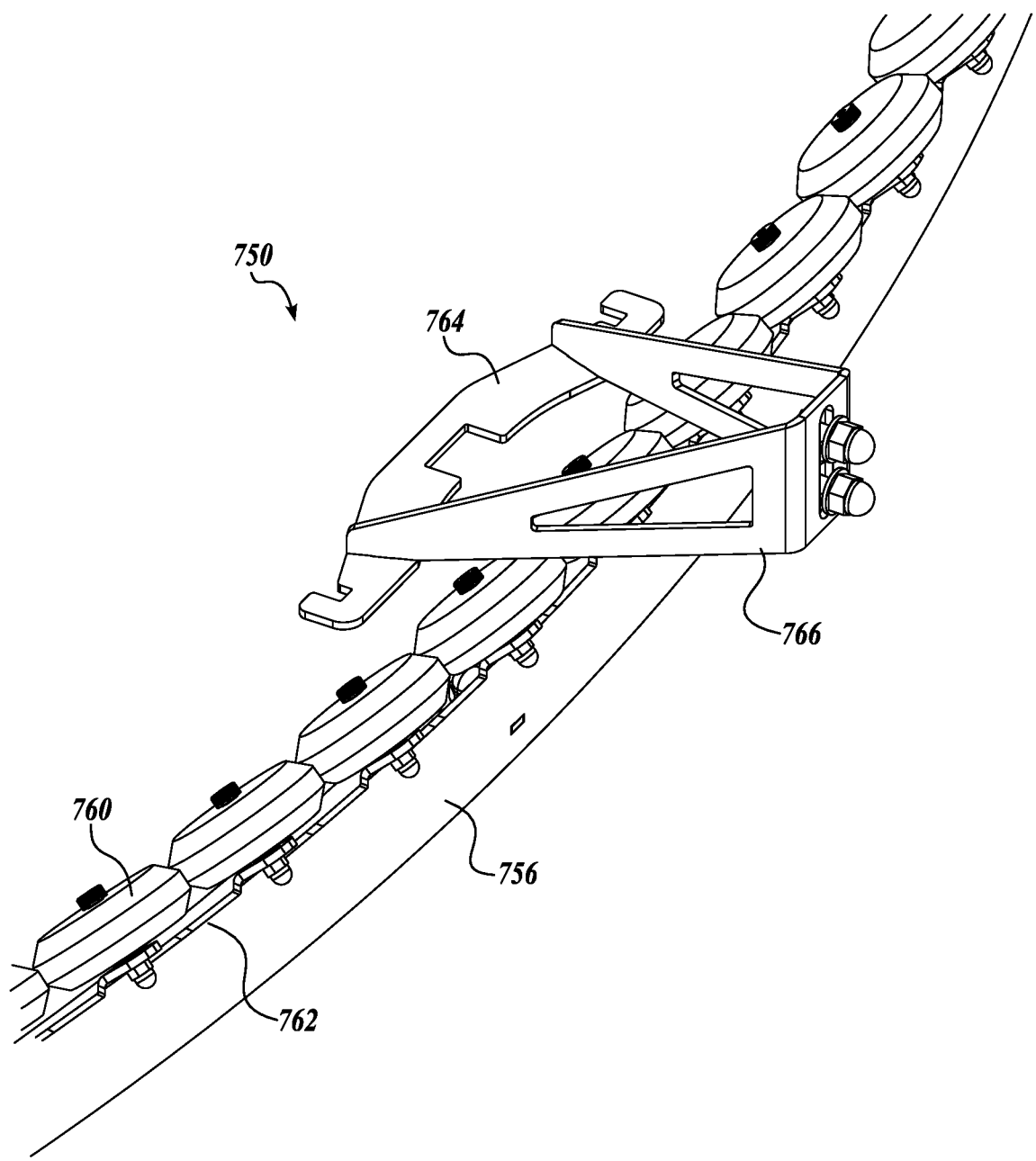
FIG. 7C is a diagrammatical illustration of a curved section of the return rail section of FIG. 7A.

Referring to FIGS. 7A and 7C, a curved return rail section 750 is illustrated. The curved return rail section 750 comprises a first inside pair of rails 752, 754 and a third outside rail 756.

In FIG. 7A, a pair of inside curved rails 752, 754 is provided. Rails 752 and 754 are equally spaced from one another to provide a space for the placement of wheels 758. Wheels 758 are supported on axles spanning rails 752, 754, at regular intervals. The wheels 758 on the inside curved rails 752, 754 rotate vertically, i.e., have the axis of rotation parallel to a ground surface.

In FIG. 7C, the outside curved rail 756 is illustrated. In one embodiment, a single rail is used for the outside curved rail 756. Wheels 760 on the outside curved rail 756 rotate on a diagonal axis, i.e., an axis of 30 degrees to 60 degrees with respect to horizontal, or about 45 degrees with respect to horizontal. The wheel axles can be supported on individual strips of metal 762 projecting at the desired angle from the rail 756.

Referring to FIG. 7C, guide blocks 226 as described in association with FIGS. 4A, 4B, and 4C can be provided on the curved section 750 of the return rail. The guide blocks 226 snap on to a holder plate 764. The holder plate 764 can be provided with slots or key holes to correspond with the keys 418, 420, and 422 of the guide block 226. The holder plate 764 is connected to a bracket 766 that extends the guide block 226 out over the conveyor belt. The bracket 766 in turn is connected to posts 768 supporting the rail systems. Further, the guide block 226 is attached to the holder plate 764 in an orientation such that the cambered surface 410 of the guide block 226 will be facing down.

Referring to FIG. 8, a downward directing rail section 800 is illustrated. The downward directing rail section 800 follows after the outfeed rail section 200 (FIG. 1B). The downward directing rail section 800 includes a first pair 802 of rails 806, 808, and a second pair 804 of rails 810, 812. The rails 806, 808 of the first pair 802 are separated by a plurality of spacers 814 providing room in between the rails 806, 808 to accommodate a pair of wedge-shaped glide strips 818, 820. The glide strips 818, 820 rest on the tops of the spacers 814 thereby raising the top surface of the glide strips 818, 820 above the top surface of the rails 806, 808, and the conveyer belt 102 will slide against the top surface of the glide strips 818, 820.

The rails 810, 812 of the second pair 804 are separated by a plurality of spacers 816 providing room to accommodate a pair of wedge-shaped glide strips 822, 824. The glide strips 822, 824 rest on the tops of the spacers 816 thereby raising the top surface of the glide strips 822, 824 above the top surface of the rails 810, 812, and the conveyer belt 102 will slide against the top surface of the glide strips 822, 824.

Figure 9A:
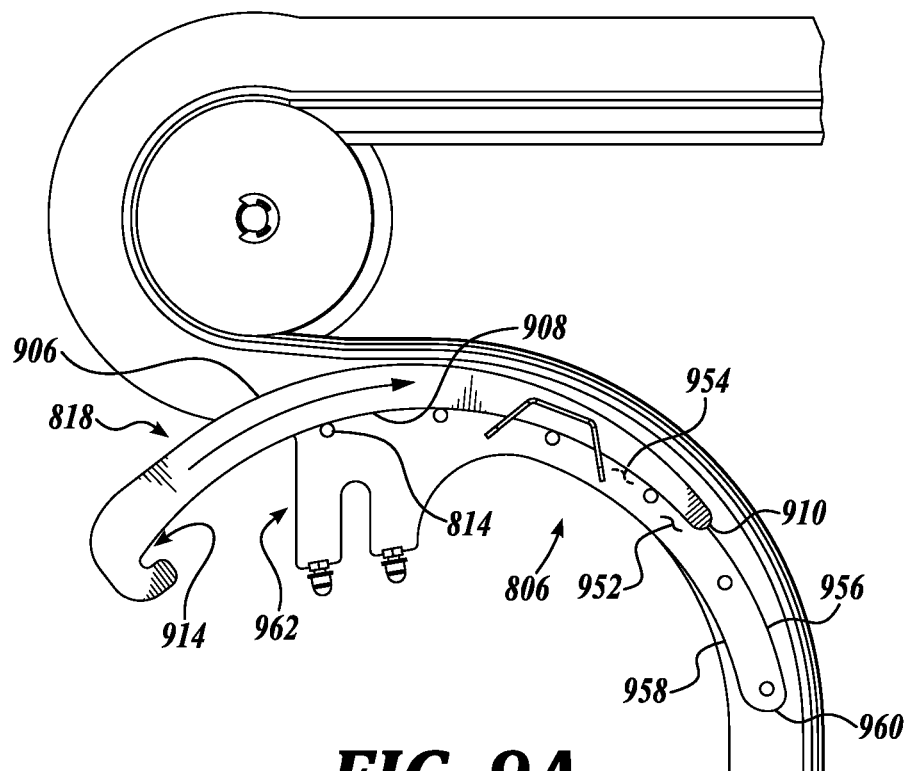
FIGS. 9A and 9B are side view diagrammatical illustrations of the downward directing rail of FIG. 8.
Figure 9B:
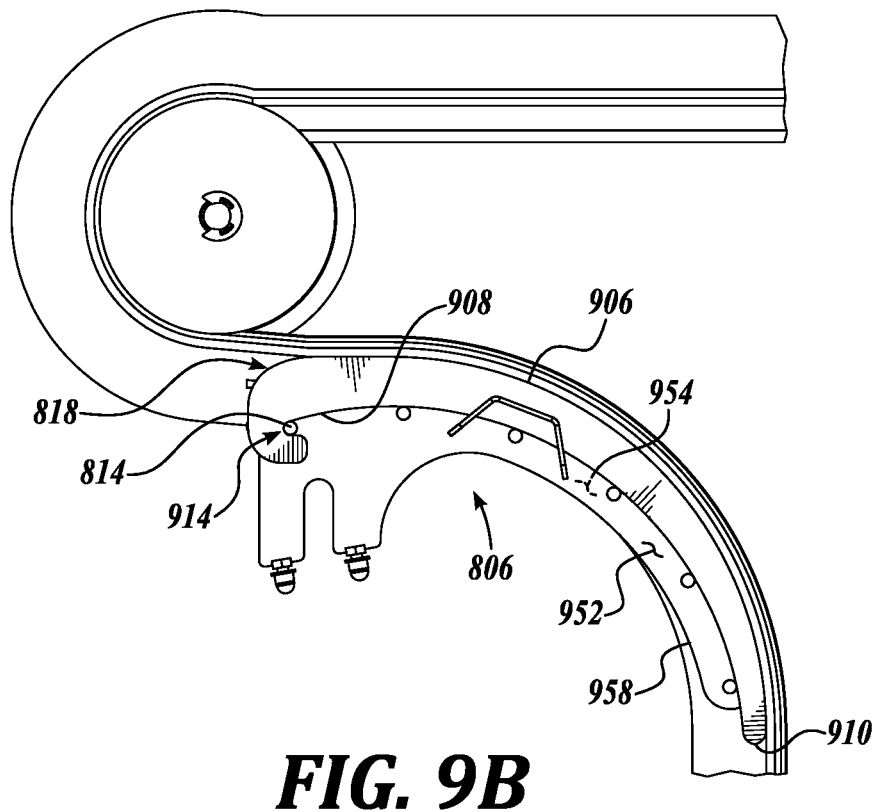
Figure 9C:
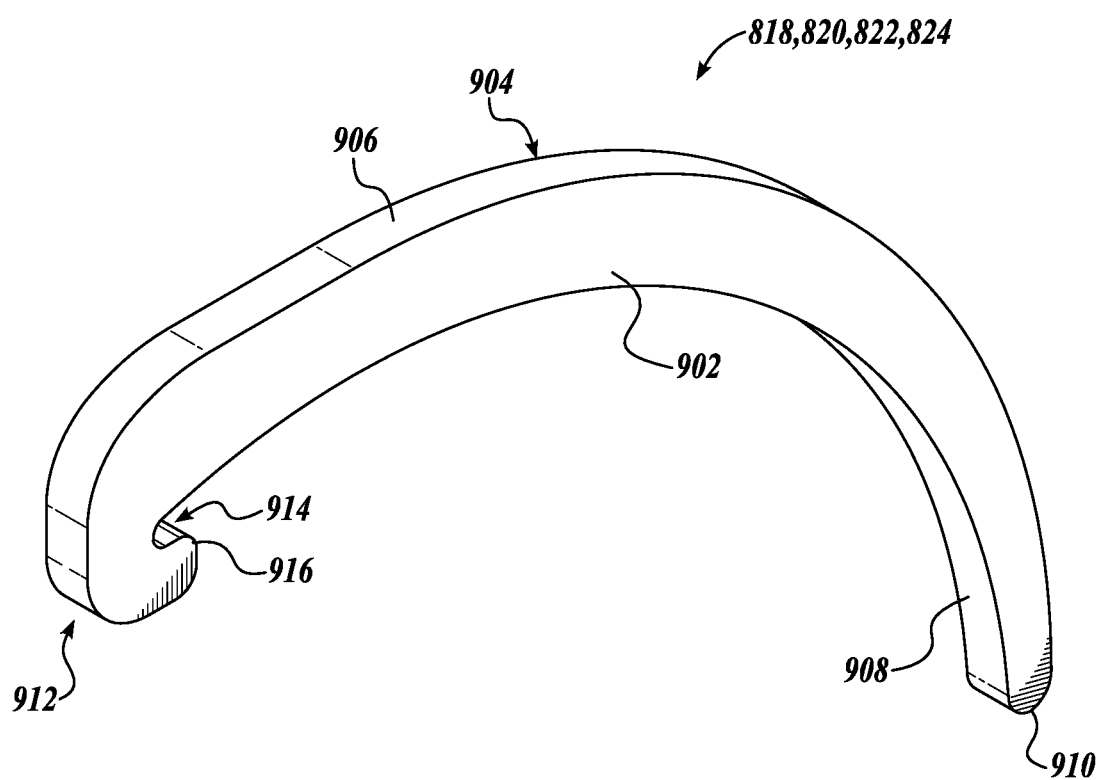
FIG. 9C is a diagrammatical illustration of a glide strip of the downward directing rail of FIG. 8.

Referring to FIG. 9C, a representative wedge-shaped glide strip for use as glide strip 818, 820, 822, and 824 is illustrated. In one embodiment, the glide strip 818, 820, 822, 824 includes an elongated monolithic elastic material having first 902 and second 904 separated congruent surfaces; a convex surface 906 extending between the first 902 and second 904 congruent surfaces; and a concave surface 908 extending between the first 902 and second 904 congruent surfaces and separated from the convex surface 906 by the first 902 and second 904 congruent surfaces. The convex surface 906 and concave surface 908 define the thickness of the glide strip. In one embodiment, the first 902 and second 904 congruent surfaces comprise first 910 and second 912 ends, wherein the first 902 and second 904 congruent surfaces taper from the second end 912 to the first rounded end 910 joining the convex surface 906 to the concave 908 surface, and wherein at the second end 912 of the first 902 and second 904 congruent surfaces, the concavity of the concave surface 908 increases to create a bend 914 of at least 90 degrees in the concave surface 908, and the concave surface 908 is joined to the convex surface 906 after the bend 914 of at least 90 degrees at an inflection point 916.

In one embodiment, the congruent surfaces 902 and 904 are parallel surfaces. In one embodiment, the bend 914 is greater than 90 degrees to result in a hook at the second end 912.

Referring to FIGS. 9A and 9B, the wedge-shaped glide strip 818 is illustrated being inserted into the rails 806 (and 808). The rail 806 (and rails 808, 810, 812) has a shape similar to the wedge-shaped glide strip 818, 820, 822, 824 at least at the upper surface so that the upper surface (the convex surface 906 rises above the upper surface of the rails to which the glide strip is attached.

In one embodiment, rail 806 (and rails 808, 810, 812) is made from a metal sheet having first 952 and second 954 (the opposite side of 952) separated congruent surfaces; a convex surface 956 extending between the first 952 and second 954 congruent surfaces; and a concave surface 958 extending between the first 952 and second 954 congruent surfaces and separated from the convex surface 956 by the first 952 and second 954 congruent surfaces. The convex surface 956 and concave surface 958 define the thickness of the rail 806. In one embodiment, the first 952 and second 954 congruent surfaces have a height that is substantially constant for a majority of the length, which ends at a first rounded end 960 joining the convex surface 956 to the concave 958 surface. At a second end 962 of the first 952 and second 954 congruent surfaces, the rail can include any structure suitable to attach the rail on the conveyor structure. In the illustrated embodiment, the second end 962 comprises two downward projecting extensions which merge with the convex surface 956 and the concave surface 958.

In FIG. 9A, the rail 806 is illustrated having a plurality of spacers 814 projecting outward. The spacers 814 are placed along the length of the rail 806 in a curved path following the curve more or less of the top convex surface 956 of the rail 806, and the spacers are placed below the top convex surface 956 such that when the glide strip 818 is placed resting on the spacers 814, the top convex surface 906 of the glide strip 818 will be above the top convex surface 956 of the rail 806. The location of the spacers 814 can depend on the amount of glide strip 818 that should project above the rail 806.

In FIG. 9A, the glide strip 818 is illustrated being inserted in the space between rails 806 and 808 and above the spacers 814 with the rounded end 910 in the leading position. Next, in FIG. 9B, the glide strip 818 has been inserted so that the bend 914 catches on the first spacer 814. The concave surface 908 of the glide strip 818 rests on the plurality of spacers 814.

As seen in FIG. 8, after the second glide strip 820 is inserted between rails 806 and 808, a latch 826 is secured at the second ends 962 of the rails 806, 808 to prevent the glide strips 818, 820 from falling out.

As with the glide strip 204 and the guide block 226, the wedge glide strip 818 is designed to improve hygiene and to allow easy replacement of the glide strips.

One benefit of having the glide strips in pairs is that one of the glide strips from a pair is always in place to support the belt while the other from the pair can be replaced. Thereby, it is not necessary to manually lift or otherwise fix the belt during glide strip replacement In a first glide strip embodiment, a snap-on glide strip 204 for a conveyor rail comprises an elongated monolithic elastic material having a constant cross-sectional shape throughout a majority of the material's length, wherein the cross-sectional shape comprises:

a topmost section 506 having a first width 520 perpendicular to the material's length and a first height 522, a bottommost section 510 having a second width 526 perpendicular to the material's length and a second height 524, wherein the second width is less than the first width, and a middle section 508 having a third width 528, wherein the middle section connects the topmost section to the bottommost section, wherein the first width is greater than the second width, and the second width is greater than the third width, and the bottommost section snaps on within slots of a conveyor rail.

In one embodiment, the topmost section 506 has an aspect ratio (width to height) from 1:1 to 5:1.

In one embodiment, an aspect ratio of the middle section 508 is from 1:1 to 1:5.

In one embodiment, an aspect ratio of the bottommost section 510 is about 1:1.

In one embodiment, a durometer of the elastic material is Shore A 60 to 90.

In one embodiment, a centroid 530, 532, 534 of the topmost, bottommost, and middle sections pass through a straight line.

In a first rail embodiment, a conveyor rail 200 comprises the glide strip 204 according to the first glide strip embodiment, and a first metal rail 214 having a plurality of supports 502 arranged along a length of the first metal rail, wherein the supports 502, 504 comprise slots 536, 538, 540 having a shape configured to receive at least the bottommost section 510 of the glide strip, and an uppermost surface of the glide strip 204 is above an uppermost surface of the first metal rail 214.

In one embodiment, the supports 502, 504 extend perpendicular from the first metal rail 214.

In one embodiment, the supports include a first 502 and second 504 type of supports.

In one embodiment, in the first type of support 502, the topmost section 506 of the glide strip 204 contacts the support, and a gap 516, 518 is between the support 502 and the middle 508 and bottommost 510 sections of the glide strip 204, wherein a load is placed on the topmost section.

In one embodiment, the support 502 includes a slot having a bottom slot section 538 wider than a top slot section 536 where it joins to the top slot section, wherein a width of the top slot section is narrower than the bottommost section 510 of the glide strip 204.

In one embodiment, in the second type of support 504, the glide strip 204 is provided with a slot 542 extending from the bottommost section 510, wherein the slot 542 of the glide strip 204 fits in a slot 540 of the second type of support.

In one embodiment, the conveyor rail further comprises a second metal rail 212, extending parallel to the first metal rail 214, wherein supports 502, 504 extend across the first and second metal rails at spaced intervals.

In one embodiment, the slots 536, 538, 540 are provided on a plurality of hangers 220 that are cut from the first metal rail 214, and the hangers are bent to extend from the first metal rail.

In one embodiment, the conveyor rail 214, 604, 704 further comprises single hangers 220, 608, 708 having one slot for the glide strip.

In one embodiment, the conveyor rail 604 further comprises double hangers comprising a first 610 and second 618 hanger, each hanger comprising a slot for the glide strip, wherein the first and second hangers are connected to each other via a side guide block support 614.

In one embodiment, a conveyor 100 comprises:

a rail system 200, 600, 700 comprising a first 208, 602, 702 and second 212, 604, 704 conveyor rail of the first rail embodiment placed on the right and left sides along the rail system 200, 600, 700; and a conveyor belt 102 resting on the topmost section 506 of the glide strips 204.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the infeed conveyor section 112, the outfeed conveyor section 116, and the return conveyor section 122 comprise the first and second conveyor rail of the first rail embodiment.

In a first guide block embodiment, a snap-on guide block 226 for a conveyor rail comprises:

an elongated monolithic elastic material having first 402 and second 404 separated congruent surfaces with first 406 and second 408 ends;

a cambered surface 410 extending between the first and second congruent surfaces; and a base surface 412 extending between the first and second congruent surfaces and separated from the cambered surface by the first and second congruent surfaces, wherein the first and second congruent surfaces each tapers at the first and second ends to an edge or rounded corner where the cambered surface meets with the base surface, and wherein the base surface includes at least one outward projecting snap-on key 418 at a middle of the base surface.

In one embodiment, a durometer of the elastic material is from Shore A 60 to 90.

In one embodiment, the guide block 226 further comprises a second key 420 on the base surface 412 at the first end 406 and a third key 422 on the base surface 412 at the second end 408.

In one embodiment, the guide block 226 further comprises a first indentation 428 on the base surface 412 between the middle and the first end 406 of the base surface, and a second indentation 430 on the base surface 412 between the middle and the second end 408 of the base surface.

In one embodiment, the first 402 and second 404 congruent surfaces are parallel and flat.

In a second rail embodiment, a conveyor rail 200, 600, 700 comprises the guide block 226 according to the first guide block embodiment, and a first metal rail 222, 604, 704 having key holes or slots arranged along a length of the first metal rail, wherein the slots have a shape configured to receive at least the key in the middle of the guide block.

In one embodiment, the conveyor rail further comprises a second metal rail 224, 602, 702 extending parallel to the first metal rail 222, 604, 704 wherein a plurality of supports 216, 606, 706 extend across the first and second metal rails at spaced intervals.

In one embodiment, the conveyor rail further comprises double hangers comprising a first 610 and second 618 hanger, wherein the first and second hangers are connected to each other via a side guide block support 614.

In one embodiment, a conveyor 100 comprises:

a rail system 200, 600, 700 comprising a first 222, 604, 704 and second 224, 602, 702 conveyor rail of the second rail embodiment placed on the right and left sides along the rail system 200, 600, 700; and a conveyor belt 102 that travel adjacent the guide blocks 226.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the infeed conveyor section 112 and the outfeed conveyor section 116 comprise the first 602, 222 and second 604, 224 conveyor rail of the second rail embodiment, and wherein the cambered surface 410 of the guide blocks 226 is facing inward.

In one embodiment, the return conveyor section 122 comprises the first 704 and second 702 conveyor rail of the second rail embodiment, and wherein the cambered surface 410 of the guide blocks 226 is facing outward.

In a first nose block embodiment for a conveyor rail, the nose block 202 comprises:

an elongated monolithic elastic material having a constant cross-sectional shape throughout a majority of the material's length, wherein the cross-sectional shape comprises:

a top surface 234;

a bottom surface 236 separated from the top surface, wherein the top surface tapers to an edge 240 or rounded corner to join with the bottom surface, wherein the edge or rounded corner is along the material's length;

a middle surface 242 between the top and bottom surfaces;

a groove 244 between the middle and bottom surfaces, wherein the groove is facing opposite from the edge or rounded corner, and the groove extends along the material's length; and a first 246 and second 246 clip at a first and second end of the nose block, wherein the first and second clip extend from the top surface to the bottom surface to provide a gap 250 between the middle surface and each of the first and second clip.

In one embodiment, a durometer of the elastic material is from Shore A 60 to 90.

In one embodiment, the clips 246, 248 extend from the top surface 234 through a diagonal connecting arm 266 to horizontal arm 268 level with the bottom surface 236.

In one embodiment, the nose block 202 further comprises cutouts 272, 274 at the ends of the nose block to allow access to the clips 246, 248 to be able to depress the clips 246, 248 to disengage the clips 246, 248.

In a third rail embodiment, a conveyor rail 200 comprises the nose block 202 according to the first nose block embodiment, and a first 208 and second 212 metal rail connected to an intermediary metal bar 252 on left and right sides thereof, wherein the intermediary metal bar 252 is attached to the nose block 202 at the nose block groove 244 and clips, 246, 248.

In one embodiment, the intermediary metal bar 252 comprises a strip 270 to fit into the groove 244.

In one embodiment, the intermediary metal bar 252 comprises a left side and right side metal dog 256 that is engaged to the clips 246, 248.

In one embodiment, a conveyor 100 comprises:

a rail system comprising a conveyor rail 200 of the third rail embodiment; and a conveyor belt 102 that travels over the top of the nose block 202.

In one embodiment, the conveyor belt 102 comprises a channel conveyor with side walls 120.

In one embodiment, the conveyor 100 is a spiral conveyor, wherein the conveyor further comprises;

an infeed conveyor section 112;

a spiral conveyor section 114 from the infeed conveyor section;

an outfeed conveyor section 116 from the spiral conveyor section;

a downward directing conveyor section 110 from the outfeed conveyor section; and a return conveyor section 122 from the downward directing conveyor section to the infeed conveyor section.

In one embodiment, the outfeed conveyor section 116 comprises the conveyor rail 200 of the third rail embodiment, and wherein the nose block edge 240 is placed facing into a direction of the conveyor belt 102.

In a second embodiment of a glide strip for a conveyor rail, the glide strip 818 comprises:

an elongated monolithic elastic material having first 902 and second 904 separated congruent surfaces;

a convex surface 906 extending between the first and second congruent surfaces; and a concave surface 098 extending between the first and second congruent surfaces and separated from the convex surface by the first and second congruent surfaces, wherein the first and second congruent surfaces comprise first 910 and second 912 ends, wherein the first 902 and second 904 congruent surfaces taper from the second end 912 to the first rounded end 910 joining the convex surface 906 to the concave 908 surface, and wherein at the second end 912 of the first 902 and second 904 congruent surfaces, the concavity of the concave surface 908 increases to create a bend 914 of at least 90 degrees in the concave surface 908, and the concave surface 908 is joined to the convex surface 906 after the bend 914 of at least 90 degrees.

In one embodiment, a durometer of the elastic material is from Shore A 60 to 90.

In one embodiment, the first 902 and second 904 congruent surfaces are parallel and flat.

In one embodiment, the bend 914 is greater than 90 degrees to result in a hook at the second end 912.

In a fourth rail embodiment, a conveyor rail 800 comprises the glide strip 818 according to the second glide block embodiment, and a first 806 and second 808 metal rail connected to each other through spacers 814, and the glide strip 818 according to the second guide block embodiment rests on the spacers and between the first and second metal rail to raise a top surface of the glide block according to the second guide block embodiment above the first and second metal rail.

In one embodiment, the glide strip 818 according to the second glide block embodiment is hooked on a spacer.

In one embodiment, the first 806 and second 808 metal rail are congruent to each other.

In one embodiment, the first 806 and second 808 metal rail are parallel to each other.

In one embodiment, the conveyor rail comprises a second glide strip 820 according to the second glide strip embodiment that rests on the spacers 814 and between the first 806 and second 808 metal rail.

In one embodiment, the first 818 and second 820 glide strips according to the second glide block embodiment are congruent to each other.

In one embodiment, the first 818 and second 820 glide strips according to the second glide strip embodiment are parallel to each other.

In one embodiment, the first and second metal rail comprise;
a metal sheet having first 952 and second 954 separated congruent surfaces;
a convex surface 956 extending between the first 952 and second 954 congruent surfaces; and
a concave surface 958 extending between the first 952 and second 954 congruent surfaces and separated from the convex surface 956 by the first 952 and second 954 congruent surfaces.

In one embodiment, a conveyor 100 comprises:
a rail system 800 comprising a first and second conveyor rail of the fourth rail embodiment placed on the right and left sides along the rail system; and a conveyor belt 102 that travels over the glide strip 818 according the second glide strip embodiment.

In one embodiment, the conveyor belt 102 comprises a channel conveyor with side walls 120.

In one embodiment, the conveyor 100 is a spiral conveyor, wherein the conveyor further comprises;
an infeed conveyor section 112;
a spiral conveyor section 114 from the infeed conveyor section;
an outfeed conveyor section 116 from the spiral conveyor section;
a downward directing conveyor section 110 from the outfeed conveyor section; and
a return conveyor section 122 from the downward directing conveyor section to the infeed conveyor section.

In one embodiment, the downward directing conveyor section 110 comprises the first and second conveyor rail of the fourth rail embodiment.

While illustrative embodiments have been illustrated and described, it will be appreciated that various changes can be made therein without departing from the spirit and scope of the invention.

The embodiments of the invention in which an exclusive property or privilege is claimed are defined as follows:

1. A conveyor rail, comprising:
a glide strip comprising:
an elongated monolithic elastic material having a constant cross-sectional shape throughout a majority of the material's length, wherein the cross-sectional shape comprises:
a topmost section having a first width perpendicular to the material's length and a first height,
a bottommost section having a second width perpendicular to the material's length and a second height, wherein the second width is less than the first width, and
a middle section having a third width, wherein the middle section connects the topmost section to the bottommost section, wherein the first width is greater than the second width, and the second width is greater than the third width, and the bottommost section snaps on within slots of the conveyor rail, and
a first metal rail having a plurality of supports arranged along a length of the first metal rail, wherein the supports comprise slots having a shape configured to receive at least the bottommost section of the glide strip, and an uppermost surface of the glide strip is above an uppermost surface of the first metal rail.

2. The conveyor rail of claim 1, wherein the supports extend perpendicular from the first metal rail.

3. The conveyor rail of claim 2, wherein the plurality of supports include a first and second type of supports.

4. The conveyor rail of claim 3, wherein in the first type of support, the topmost section of the glide strip contacts the support, and a gap is between the support and the middle and bottommost sections of the glide strip, wherein a load is placed on the topmost section.

5. The conveyor rail of claim 4, wherein the support includes a slot having a bottom slot section wider than a top slot section where it joins to the top slot section, wherein a width of the top slot section is narrower than the bottommost section of the glide strip.

6. The conveyor rail of claim 3, wherein in the second type of support, the glide strip is provided with a slot extending from the bottommost section, wherein the slot of the glide strip fits in a slot of the second type of support.

7. The conveyor rail of claim 1, further comprising a second metal rail, extending parallel to the first metal rail, wherein supports extend across the first and second metal rails at spaced intervals.

8. The conveyor rail of claim 1, wherein the slots are provided on a plurality of hangers that are cut from the first metal rail, and the hangers are bent to extend from the first metal rail.

9. The conveyor rail of claim 1, comprising single hangers having only one slot for the glide strip.

10. The conveyor of claim 1, comprising double hangers comprising a first and second hanger, each hanger comprising a slot for the glide strip, wherein the first and second hangers are connected to each other via a side guide block support.

11. A conveyor comprising:
a rail system comprising a first and second conveyor rail of claim 1 placed on the right and left sides along the rail system; and
a conveyor belt resting on the topmost section of the glide strips.

12. The conveyor of claim 11, wherein the conveyor belt comprises a channel conveyor with side walls.

13. The conveyor of claim 11, wherein the conveyor is a spiral conveyor, wherein the conveyor further comprises;
an infeed conveyor section;
a spiral conveyor section from the infeed conveyor section;
an outfeed conveyor section from the spiral conveyor section;
a downward directing conveyor section from the outfeed conveyor section; and
a return conveyor section from the downward directing conveyor section to the infeed conveyor section.

14. The conveyor of claim 13, wherein the infeed conveyor section, the outfeed conveyor section, and the return conveyor section comprise the first and second conveyor rail of claim 1.

15. The conveyor of claim 1, wherein the topmost section has an aspect ratio (width to height) from 1:1 to 5:1.

16. The conveyor of claim 1, wherein an aspect ratio of the middle section is from 1:1 to 1:5.

17. The conveyor of claim 1, wherein an aspect ratio of the bottommost section is about 1:1.

18. The conveyor of claim 1, wherein a durometer of the elastic material is from Shore A 60 to 90.

19. The conveyor of claim 1, wherein a centroid of the topmost, bottommost, and middle sections pass through a straight line.

* * * * *